US012561849B2

(12) United States Patent
Rhyu et al.

(10) Patent No.: US 12,561,849 B2
(45) Date of Patent: Feb. 24, 2026

(54) METHOD AND APPARATUS FOR SPLIT RENDERING BASED ON UE ESTIMATION

(71) Applicant: Samsung Electronics Co., Ltd., Suwon-si (KR)

(72) Inventors: Sungryeul Rhyu, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 18/428,398

(22) Filed: Jan. 31, 2024

(65) Prior Publication Data

US 2024/0273776 A1 Aug. 15, 2024

(30) Foreign Application Priority Data

Feb. 10, 2023 (KR) ........................ 10-2023-0018295

(51) Int. Cl.
*G06T 11/00* (2006.01)
*G06F 3/0346* (2013.01)
(Continued)

(52) U.S. Cl.
CPC ............ *G06T 11/00* (2013.01); *G06F 3/0346* (2013.01); *H04L 43/0864* (2013.01);
(Continued)

(58) Field of Classification Search
CPC ..... G06T 11/00; G06T 2200/16; H04L 65/70; H04L 43/0864; G06F 3/0346; H04N 7/035
See application file for complete search history.

(56) References Cited

U.S. PATENT DOCUMENTS

2020/0098186 A1    3/2020  Xue et al.
2021/0185294 A1*   6/2021  Malaika ............... H04N 13/122
(Continued)

FOREIGN PATENT DOCUMENTS

WO    2022-015020 A1    1/2022
WO    2022-188726 A1    9/2022

OTHER PUBLICATIONS

International Search Report dated Apr. 24, 2024, issued in International Patent Application No. PCT/KR2024/001127.

*Primary Examiner* — Lixi C Simpson
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting higher data transmission rates. A method by a user equipment (UE) supporting UE estimation-based split rendering is provided. The method includes estimating, at a first time point, a pose of the UE of a second time point indicating a target display time for a first media frame, transmitting the first media frame and first pose information related to the estimated pose to a server, receiving a second media frame, generated by rendering based on the first media frame and the estimated pose, and second pose information associated with the second media frame from the server, and displaying a third media frame at a third time point based on the second media frame and the second pose information.

17 Claims, 18 Drawing Sheets

(51) Int. Cl.
| | | |
|---|---|---|
| *H04L 43/0864* | (2022.01) | |
| *H04L 65/70* | (2022.01) | |
| *H04N 7/035* | (2006.01) | |

(52) U.S. Cl.
CPC ............. *H04L 65/70* (2022.05); *H04N 7/035*
(2013.01); *G06T 2200/16* (2013.01)

(56) References Cited

U.S. PATENT DOCUMENTS

| | | | |
|---|---|---|---|
| 2021/0360330 A1 | 11/2021 | Stockhammer et al. | |
| 2022/0066543 A1 | 3/2022 | Rhyu et al. | |
| 2022/0095313 A1* | 3/2022 | Kim ..................... | H04L 1/1883 |
| 2022/0369000 A1 | 11/2022 | Bouazizi et al. | |
| 2023/0139216 A1* | 5/2023 | Otsuka ................ | H04N 21/431 |
| | | | 348/39 |
| 2023/0316583 A1 | 10/2023 | Yip et al. | |

* cited by examiner

800

```
- poseSet
      · timePoseSetSent
      · numberOfPosePair
      · earliestDeadline (estimated T2earlist)
      · latestDeadline (estimated T2latest)
      · posePair[ ]
```

```
- posePair
      · estimatedPose
            · poseType (0: quaternion, 1: xyzrpy)
            · pose[ ] (if poseType==0, x,y,z,w)
                  (if poseType==1, x,y,z,r,p,y)
      · srMetadata
```

```
- srMetadata
      · timePoseEstimated (T1)
      · timePoseSetSent (T1')
      · timeEstimatedDisplayTarget (T2 estimated)
      · timeActualDisplay (T2 actual)
      · timeRenderStarted (T3)
      · timeRenderFinished (T4)
      · timeEncodeFinished (T5)
      · timeFrameReceive (T6)
      · timeLateStageReprojection (T7)
      · timeRenderToPhotonPercentile[ ]
```

FIG. 10

METHOD AND APPARATUS FOR SPLIT RENDERING BASED ON UE ESTIMATION

CROSS-REFERENCE TO RELATED APPLICATION(S)

This application is based on and claims priority under 35 U.S.C. § 119(a) of a Korean patent application number 10-2023-0018295, filed on Feb. 10, 2023, in the Korean Intellectual Property Office, the disclosure of which is incorporated by reference herein in its entirety.

BACKGROUND

1. Field

The disclosure relates to a method and an apparatus for providing split rendering based on a user equipment (UE) estimation in a communication system.

2. Description of Related Art $5^{th}$ generation (5G) mobile communication technologies define broad frequency bands such that high transmission rates and new services are possible, and can be implemented not only in "Sub 6 GHz" bands, such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced mobile broadband, (eMBB), ultra reliable & low latency communications (URLLC), and massive machine-type communications (mMTC), there has been ongoing standardization regarding beamforming and massive multiple-input multiple-output (MIMO) for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for securing coverage in an area in which communication with terrestrial networks is impossible, and positioning.

Moreover, there has been ongoing standardization in wireless interface architecture/protocol fields regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service fields regarding a 5G baseline architecture (for example, service based architecture or service based interface) for combining network functions virtualization (NFV) and software-defined networking (SDN) technologies, and mobile edge computing (MEG) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), and the like (XR=AR+VR+MR), 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for securing coverage in terahertz bands of 6G mobile communication technologies, full dimensional MIMO (FD-MIMO), multi-antenna transmission technologies, such as array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

Split rendering may include an operation in which a device, such as a server performs a rendering process on behalf of a user equipment (UE), and transmits a rendered result according to the rendering process to the UE. In split rendering, the server may perform a rendering process using information about content on which the rendering process is to be performed and viewpoint information (e.g., a pose and/or a field of view) provided by the UE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for providing split rendering for computing capability allocation between a user equipment (UE) and a server in a communication system.

Another aspect of the disclosure is to provide a method and an apparatus for performing computing (e.g., a rendering process) on a server based on an estimated pose provided by a UE for split rendering.

Another aspect of the disclosure is to provide a method and an apparatus for correcting a final pose to be applied to a result to be displayed, based on a result of the computing (e.g., a rendered result) received from a server.

Another aspect of the disclosure is to define components to be used for split rendering in a communication system, and may measure or estimate the times required for the components.

Another aspect of the disclosure is to provide a method and an apparatus for transferring, between a UE and a sever deliver, information on the times required for components for split rendering.

Another aspect of the disclosure is to provide a method and an apparatus for instructing or recommending a split rendering operation (e.g., pose selection) to a server.

Another aspect of the disclosure is to provide a method and an apparatus for notifying a UE of information related to a split rendering operation (e.g., pose selection) of a server.

Additional aspects will be set forth in part in the description which follows and, in part, will be apparent from the description, or may be learned by practice of the presented embodiments.

In accordance with an aspect of the disclosure, a method by a user equipment (UE) supporting split rendering in a communication system is provided. The method includes estimating, at a first time point, a pose of the UE of a second time point indicating a target display time for a first media frame, transmitting the first media frame and first pose information related to estimated pose to a server, receiving a second media frame, generated by rendering based on the first media frame and estimated pose, and second pose information related to the second media frame from the server, generating a third media frame by correcting the second media frame based on metadata and an actual pose of the UE, and displaying the third media frame at a third time point.

In accordance with another aspect of the disclosure, a method by a server supporting split rendering in a communication system is provided. The method includes receiving first media frame and first pose information related to an estimated pose of an user equipment (UE) from the UE, generating a second media frame by rendering based on the first media data and estimated pose, and transmitting the second media frame and second pose information related to the second media frame to the UE.

In accordance with another aspect of the disclosure, a UE for supporting split rendering in a communication system is provided. The UE includes a transceiver, memory, and a processor coupled with the transceiver and the memory, wherein the memory store one or more computer programs including computer-executable instructions that, when executed by the processor, cause the UE to estimate, at a first time point, a pose of a UE of a second time point indicating a target display time for a first media frame, transmit the first media frame and first pose information related to estimated pose to a server, receive a second media frame, generated by rendering based on the first media frame and estimated pose, and second pose information related to the second media frame from the server, generate a third media frame by correcting the second media frame based on metadata and an actual pose of the UE, and display the third media frame at a third time.

In accordance with another aspect of the disclosure, a server for supporting split rendering in a communication system is provided. The server includes a network interface, memory, and a processor coupled with the network interface and the memory, wherein the memory store one or more computer programs including computer-executable instructions that, when executed by the processor, cause the server to receive first media frame and first pose information related to an estimated pose of a UE from the UE, generate a second media frame by rendering based on the first media data and estimated pose, and transmit the second media frame and second pose information related to the second media frame to the UE.

In accordance with another aspect of the disclosure, one or more non-transitory computer-readable storage media storing computer-executable instructions that, when executed by one or more processors of a user equipment (UE), cause the UE to perform operations are provided. The operations include estimating, at a first time point, a pose of the UE of a second time point indicating a target display time for a first media frame, transmitting the first media frame and first pose information related to estimated pose to a server, receiving a second media frame, generated by rendering based on the first media frame and estimated pose, and second pose information associated with the second media frame from the server, generating a third media frame by correcting the second media frame based on metadata and an actual pose of the UE, and displaying the third media frame at a third time point.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 illustrates an information structure of a pose set according to an embodiment of the disclosure;

FIG. 9 illustrates an information structure of a pose pair according to an embodiment of the disclosure;

FIG. 10 illustrates an information structure of SR metadata according to an embodiment of the disclosure;

Throughout the drawings, it should be noted that like reference numbers are used to depict the same or similar elements, features, and structures.

DETAILED DESCRIPTION

Figure 1:
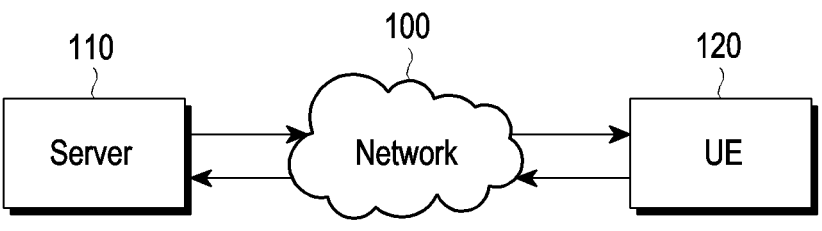
FIG. 1 illustrates a structure of a communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea. In addition, the terms which will be described below are terms defined based on the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in the description of the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description, a base station (BS) is an entity that allocates resources to terminals, and may be at least one of a gNode B, an eNode B, a Node B (or xNode B, where x is an alphabet including "g" and "e"), a wireless access unit, a base station controller, a satellite, an airborne, and a node on a network. A user equipment (UE) may include a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Additionally, there may be a "sidelink (SL)" that refers to a radio link via which a UE transmits a signal to another UE.

Furthermore, in the following description, LTE, LTE-A, or 5G systems may be described by way of example, but the embodiments of the disclosure may also be applied to other communication systems having similar technical backgrounds or channel types. Examples of such communication systems may include 5G-Advance, NR-advance, or 6th generation (5G) mobile communication technologies developed beyond 5G mobile communication technologies (or new radio; NR), and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in the embodiments of the disclosure, the term "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a structure of a communication system according to an embodiment of the disclosure.

Referring to FIG. 1, the communication system may include at least one terminal (UE) (e.g., a UE 120) capable of accessing a network 100. The network 100 may include one or more nodes (e.g., at least one base station and at least one core network (CN) node) that support wireless access by the UE 120. The base station may be referred to as an "access point (AP)", "eNodeB (eNB)", "gNodeB (gNB)", "5th generation node (5G node)", "wireless point", "transmission/reception point (TRP)", or any other term having an equivalent technical meaning.

The UE 120 is a device that may be used by a user to perform communication over a wireless channel. According to an embodiment of the disclosure, the UE 120 is a device that performs machine type communication (MTC) and may not be carried by a user. The UE 120 may be referred to as a "user equipment (UE)", "mobile station", "subscriber station", "remote UE", "wireless terminal", or "user device", or any other term having an equivalent technical meaning.

The UE 120 may include a split rendering client, and may be connected, through the network 100, to a server 110 that provides split rendering (e.g., a split rendering (SR) edge application service (EAS) server).

Split rendering is a technique for allocating computing capability between the UE 120 and the server 110. When the required performance of applications or content that should be executed (e.g., content reproducing) on the UE 120 is relatively high compared to the performance of the UE 120, the UE 120 may generate factors/parameters for executing content or applications and deliver the factors/parameters to the server 110. The server 110 may execute the content or applications based on the received factors/parameters and then deliver a result thereof (e.g., a rendered result) to the UE 120.

Depending on a use case, a temporal difference may occur between a computing time required for the server 110 to execute the content or applications, a time required for transmission of factors (e.g., pose information), and/or a time required for transmission of a computing result (e.g., a media frame). For example, in augmented reality (AR), a result obtained by execution on the server 110 by using, as a factor, a spatial "position and orientation (e.g., direction)" (hereinafter referred to as a pose) of the UE 120 of a first time point may be received by the UE 120 at a second time point, and the larger the gap between the first and second time points, the higher the degree of nausea felt by the user.

Figure 2:
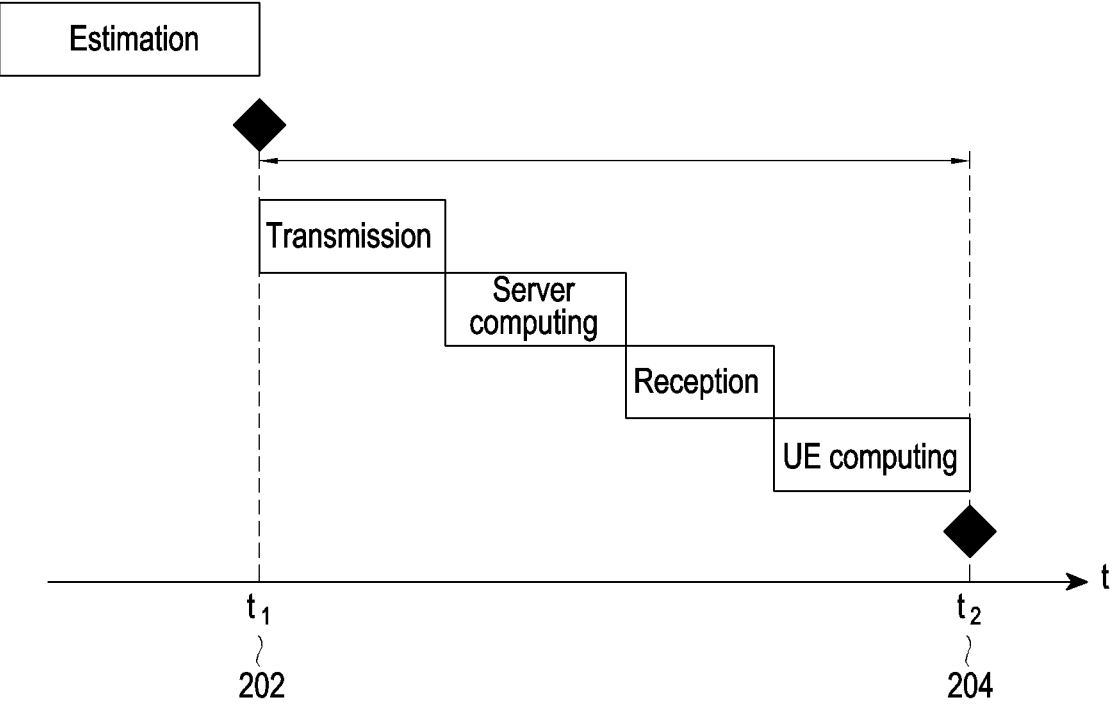
FIG. 2 illustrates a pose correction of split computing according to an embodiment of the disclosure.

FIG. 2 illustrates a pose correction of split computing according to an embodiment of the disclosure.

Referring to FIG. 2, the UE 120 may execute an operation of estimating a second time point (t2) 204 at a first time point (t1) 202, an operation of estimating a pose of the UE 120 of the estimated second time point (t2) 204, and an operation of transmitting the estimated pose to the server 110. After performing server computing (e.g., rendering) by the server 110, the UE 120 may execute an operation of receiving a result of the computing (e.g., a computing result or a rendered result), obtained by execution of the estimated pose as a factor, from the server 110, and an operation of performing UE computing (e.g., a final pose correction) on the received result based on a difference between the pose of the UE of the second time point 204 that has been estimated at the first time point 202 and an actual pose measured at the second time point 204.

The time taken for the server 110 to perform rendering based on a user's pose, and for a result of the rendering to be displayed on a display of the UE 120 and perceived by the user's eyes is referred to as a pose-to-render-to-photon (P2R2P) delay. Although "photon" mainly describes a phenomenon that the rendered result is displayed on the display to be perceived by the user's eyes, a time point at which the rendered result is perceived by a user by means of a device (e.g., an audio device or a haptic device) other than the display may also be expressed as a "photon time point".

Estimation of a pose of the UE 120 may include an operation of estimating the second time point described above and an operation of estimating a pose of the UE 120 of the second time point. The period of time between the first time point and the second time point may include at least one of a time for the UE 120 to transmit the estimated pose, a computing time required for the server 110 to execute content or applications by using the received pose as a factor, a transmission time required for a result generated as the result of the computing to be transmitted from the server 110 to the UE 120, or a UE computing time used for the UE 120 to correct the result by using a final pose of the second time point. The second time point may be determined based on one or more combinations of the performance of the UE 120, the transmission performance of a wireless communication network (e.g., the network 100) which the UE 120 has accessed, the number of other UEs concurrently accessing the network 100 or server 110, the complexity of the content and/or applications (hereinafter referred to as content/applications) that the UE 120 is to execute, or the resource performance of server computing instances allocated by server 110 to provide a split rendering service. Further, for the same combination, the second time point may be determined based on at least one of movement of the user and the UE 120, a change in the complexity of the content/applications selected by the user, or a change in computing time based on the change in complexity. Accordingly, it is very likely that the second time point, which is estimated by the UE 120 at the first time point, and the second time point that actually happened or actually displayed are not identical. In other words, accurate estimation of the second time point may be difficult.

Figure 3A:
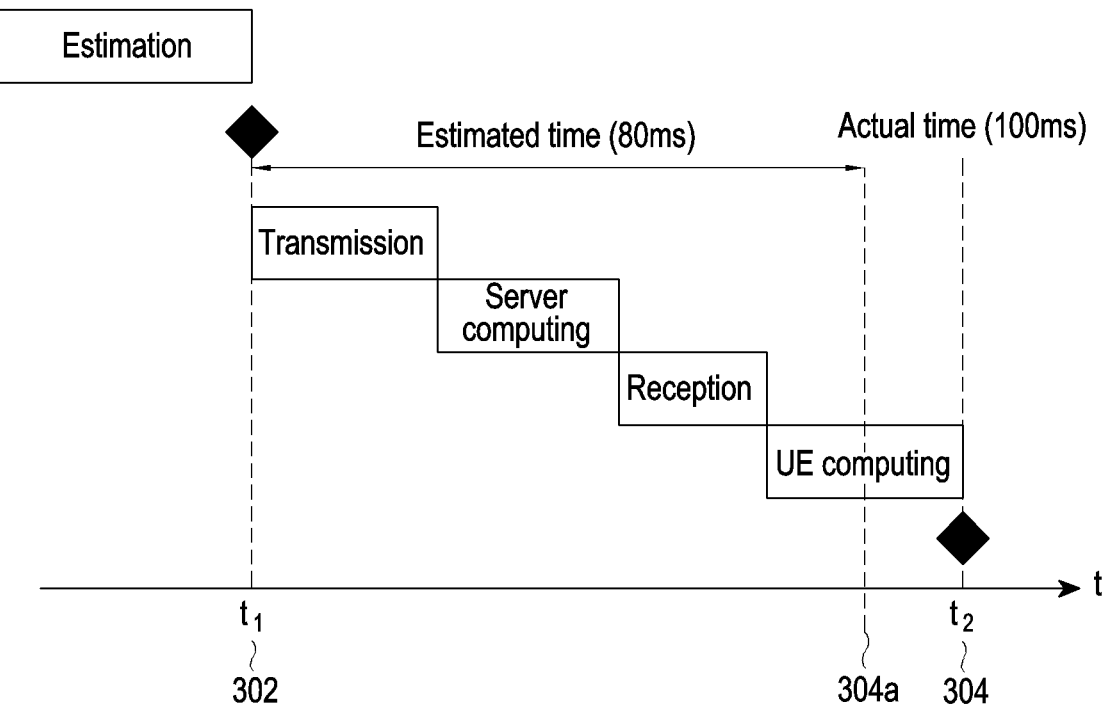
FIG. 3A illustrates a result of a server based on incorrect estimations according to an embodiment of the disclosure.

FIG. 3A illustrates a result of a server based on incorrect estimations according to an embodiment of the disclosure.

Figure 3B:
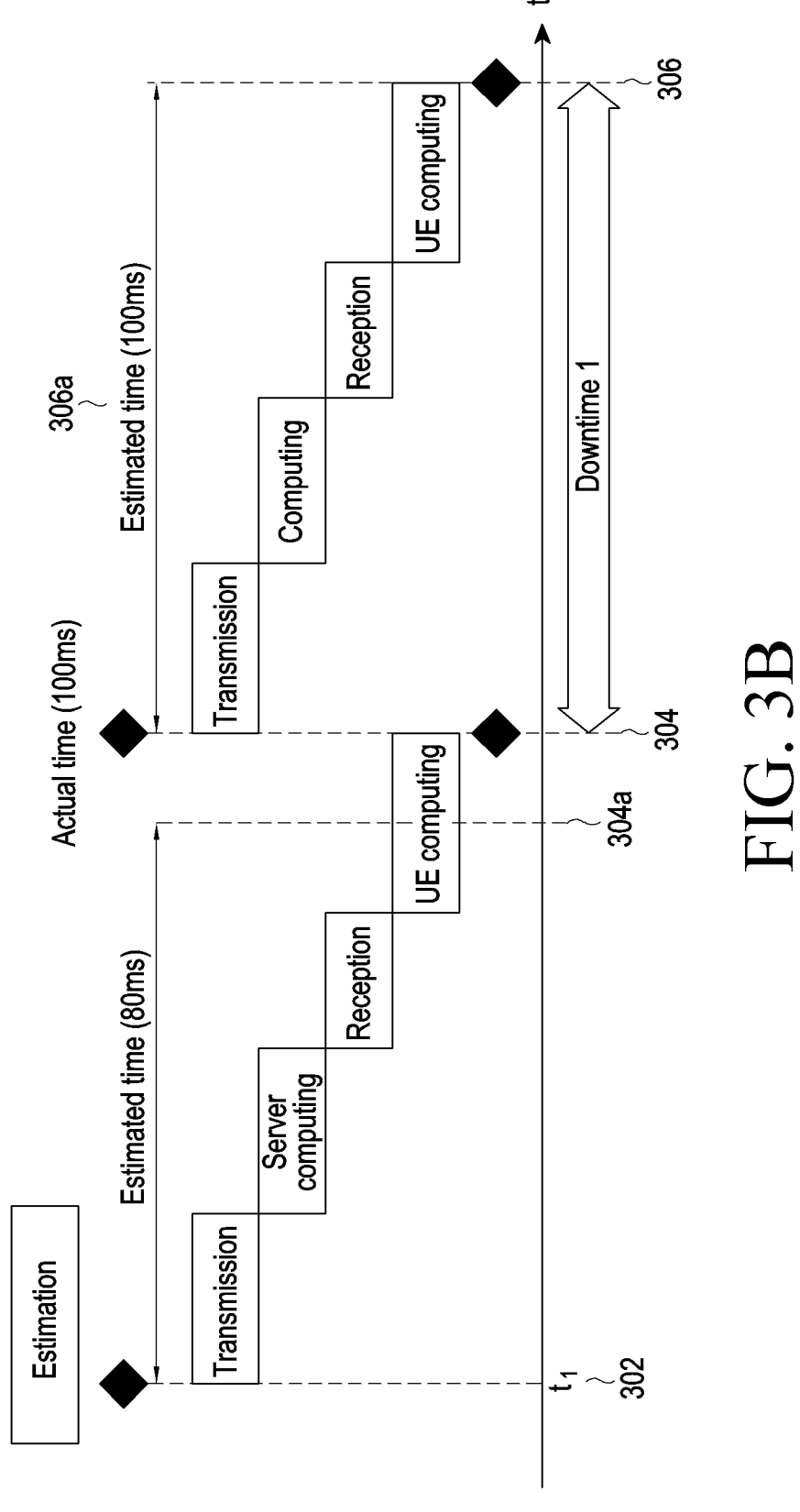
FIG. 3B illustrates a result of a server based on incorrect estimations according to an embodiment of the disclosure.

FIG. 3B illustrates a result of a server based on incorrect estimations according to an embodiment of the disclosure.

Figure 4:
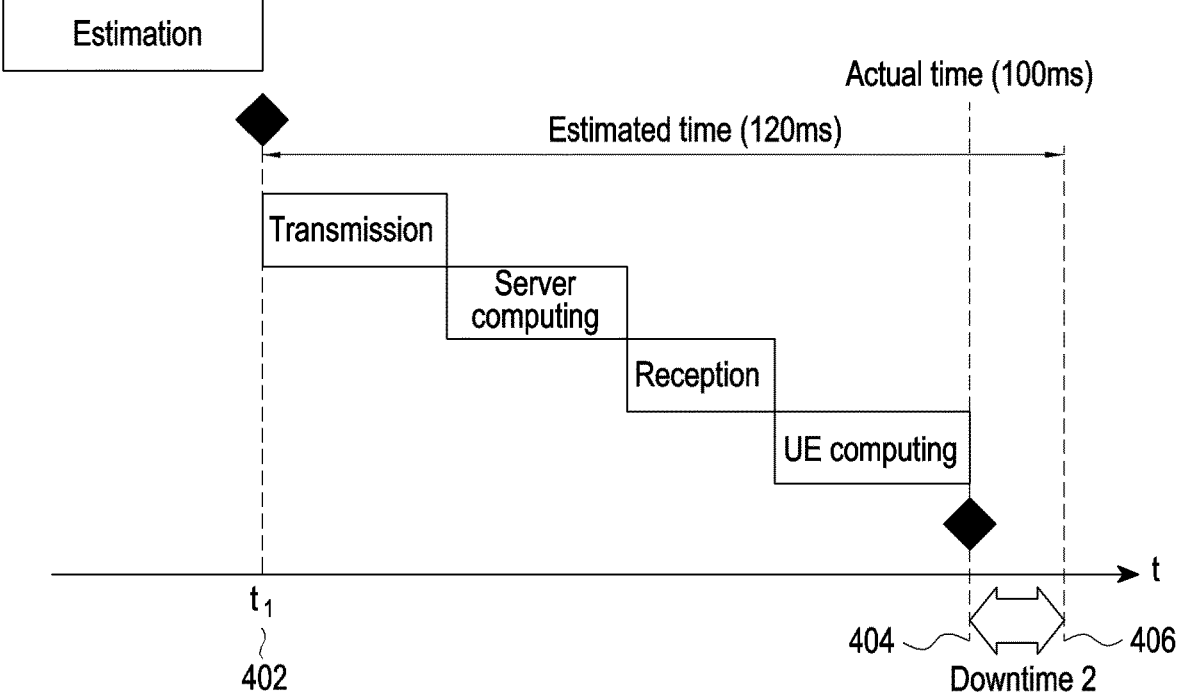
FIG. 4 illustrates a result of a server based on incorrect estimations according to an embodiment of the disclosure.

FIG. 4 illustrates a result of a server based on incorrect estimations according to an embodiment of the disclosure.

Referring to FIG. 3A, a second time point 304a estimated by the UE 120 may be earlier than a second time point 304 that actually happened. For example, although the UE 120 has estimated, as the second time point 304a, a time after 80 ms from a first time point 302, when the second time point 304 that actually happened after performing operations of split rendering (e.g., transmission, server computing, reception, and UE computing) occurs after 100 ms from the first time point 302, content which the UE 120 may show a user at the second time point 304 that actually happened may be a result about a time that has already passed (e.g., the estimated second time point 304a).

Referring to FIG. 3B, an additional 100 ms 306a may be required for the UE 120 to transmit the pose again to the server 110 and receive a result, and the UE 120 may only reproduce a result that is usable at a time point 306 after 200 ms from the time point 302 at which the second time point 304a has been first estimated.

Referring to FIG. 4, a second time point 406 estimated by the UE 120 may be later than a second time point 404 that actually happened. For example, although the UE 120 has estimated, as a second time point 406, a time after 120 ms from a first time point 402, when the second time point 404 that actually happened after performing operations of the split rendering (e.g., transmission, server computing, reception, and UE computing) occurs after 100 ms from the first time point 402, content which the UE 120 may show a user at the second time point 404 that actually happened may not yet be available or may correspond to content for the future.

Although the UE 120 may wait an additional 20 ms from the second time point 404 that actually happened to reproduce the result provided by the server 110, the later the estimated second time point 406 than the actually-happened second time point 404, the larger the pose estimation error may be, and accordingly, the result may not match the actual pose at the second time point 404, resulting in a degradation of the content quality based on the final pose correction.

In the prior art, although the UE 120 may estimate the second time point based on past statistical records, the above-described issues arising from the difference between the estimated second time point and the second time point that actually happened may result in an outage duration (e.g., downtime) where content on screen does not match intended content.

Since split rendering may operate based on statistical records managed by the UE 120 itself, it is necessary to define the temporal components that exist between the UE 120 and the server 110, and the exchange of estimated and actual computing time for the temporal components.

Although the number of poses estimated by the UE 120, the number of poses actually processed by the server 110, and the number of frames per second in which the UE 120 displays a result of the server 110 may be different, the server 110 does not know which of the poses transmitted by the UE 120 will be used to execute content or applications, and the UE does not know which pose has been used to make the result of the server 110. For example, the UE 120 may acquire 1000 to 4000 poses per second via the at least one sensor, and the number of poses estimated by the UE 120 and the number of poses transmitted from the UE 120 to the server 110 may be 1000 or more. However, the number of frames per second of video that may be reproduced by the UE 120 may be, for example, 60 frames, and thus the number of poses processed by the server 110 may also be 60. In the prior art, the UE 120 could not request the server 110 to select a pose among 1000 poses per second to process 60 frames per second. In the prior art, when the server 110 has selected and processed 60 frames among 1000 poses per second, the server 110 has been unable to notify the UE 120 of a pose used for each frame.

In the following embodiments of the disclosure, split rendering may include the UE estimating a pose, the server performing computing (e.g., rendering) based on the estimated pose transmitted from the UE, the UE receiving a result of computing of a server (e.g., a rendered result), and the UE correcting the computing result based on the final pose and outputting the corrected computing result to a display. The following embodiments may define components for each stage configuring the split rendering and measure the time required for components for each stage. The following embodiments may transfer, between a UE and a server, information on the times required for the components. The following embodiments may allow the UE to instruct or recommend an operation of the server (e.g., pose selection).

Figure 5:
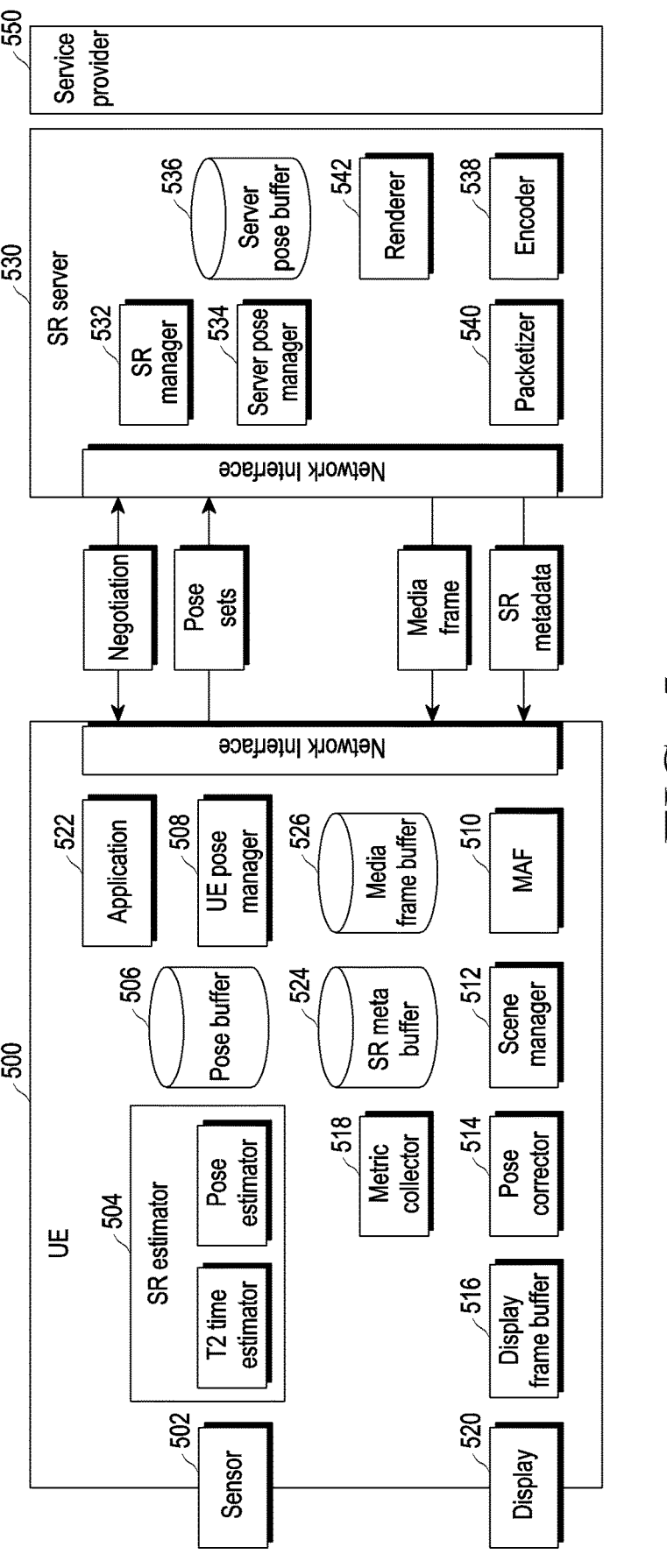
FIG. 5 illustrates a structure of a user equipment (UE) estimation-based split rendering system according to an embodiment of the disclosure.

FIG. 5 illustrates a structure of a UE estimation-based split rendering system according to an embodiment of the disclosure.

Referring to FIG. 5, a UE 500 may generate, from at least one sensor 502 (e.g., a motion sensor and/or camera) included internally or externally, information (e.g., a pose) about an absolute or relative position of the UE 500 in a space in which the UE 500 is located and an orientation (e.g., a direction) in which the UE 500 faces.

A pose generated at each moment (e.g., an input pose) may be applied as input to a split rendering (SR) estimator 504. The SR estimator 504 may include a time estimator that estimates a second time point (T2), which is a target display time, and a pose estimator that generates, from the input pose, an estimated pose in which the UE 500 will be positioned at the T2 time estimated by the time estimator.

The estimated pose generated by the SR estimator 504 may be stored in a pose buffer 506 before being transmitted to a server 530 (e.g., a split rendering server). One target display time and an estimated pose for the target display time are called a pose pair (e.g., a pair of pose and metadata).

A UE pose manager 508 (e.g., a client pose manager) may bundle the poses (e.g., pose pairs) that have been input and stored in the pose buffer 506 into at least one pose set and transmit the pose set to the server 530. The pose set may be transmitted periodically or aperiodically according to determination of the UE pose manager 508. At least one pose set in one transmission may include estimated poses for a time duration that does not overlap at least one pose set included in a previous transmission, or may include estimated poses for a time duration that at least partially overlaps at least one pose set included in a previous transmission. For example, in case that the aspect of a user's movement changes from that of the previous estimation, a newly estimated pose with respect to the poses that are expected to have not yet been processed by the server 530 among the already transmitted poses may be included in the pose set and retransmitted to the server 530.

TA server pose manager 534 of the server 530 may store the poses, which are included in the pose sets received from the UE 500, in a server pose buffer 536, and may select at least one pose, which is required at a time point at which a renderer 542 starts a new rendering, from among the poses stored in the server pose buffer 536. Regardless of the order in which the pose sets are received from the UE 500, the server pose manager 534 may identify the order in which the UE 500 has transmitted the pose sets, and may compare pairs of poses, having been already received and stored in the server pose buffer 536, with pairs of poses of pose sets that are later transmitted and received to update pairs of poses that have the same target display time.

The SR manager of the server 530 may perform, through negotiation between an application (e.g., an application 522) of the UE 500 that wishes to use the split rendering service and a service provider 550, at least one of determining UE data (e.g., pose sets and UE performance information) to be provided by the UE 500 to the server 530, determining a subject of computing that is executed by the server 530 (e.g., rendering of content or applications), determining the type and form of a result (e.g., a result of the server) that should be provided (e.g., 2D video/audio streams and pose pairs), establishing a transmission session for transmitting the UE data and the result of the server, or allocating server computing resources. An SR manager 532 may determine operating multiple renderers (e.g., the renderer 542) and multiple encoders (e.g., an encoder 538) that produce the results having different qualities by comparing the target display time received from the UE 500 with a time taken to rendering and encoding of the server 530, operate the renders and encoders, and determine to transmit a result satisfying requirements among the outputs of the renderers and encoders to the UE 500. The at least one renderer 542 and the at least one encoder 538 may configure a split rendering function (SRF).

The renderer 542 is one of server instances allocated and initialized by the SR manager 532, and may execute (e.g., render), on behalf of the UE 500, content or applications designated by the SR manager 532 and deliver the results thereof to the encoder 538. The renderer 542 may receive at least one pose pair from the server pose manager 534, and may execute the designated content or applications assuming that the UE 500 is located in an estimated pose at the target display time for the pose pair. The renderer 542 may receive configurations regarding the type and form of the one or more results from the SR manager 532 and output the one or more results based on the configurations. When configurations regarding the type and form of two or more results are received, the renderer 542 may include two or more logical renderers corresponding to the results. Different renderers may produce different results for a pair of poses received from the server pose manager 534, and each result and a rendering start time or a time taken for rendering may be delivered to the encoder 538 (e.g., one or more logical encoders).

The encoder 538 is one of server instances allocated and initialized by the SR manager 532, and may encode the result of the renderer 542 into a form (e.g., at least one media frame) that can be delivered to the UE 500. The encoder 538 may receive, from the renderer 542, information about the pairs of poses that the renderer 542 used to generate each audio frame or video frame, and time information related to the start time of each rendering and a time taken for each rendering. The encoder 538 may insert the pose pairs and time information as additional information of the media frame or deliver the same to a packetizer 540, depending on the configurations of the SR manager 532. The SR manager 532 may operate one or more encoders 538 that support one or more different encoding qualities for each rendered result. When two or more encoders 538 are executed, the computing time required on the server 530 may include both the time required for rendering and encoding up to a time point at which the generation of the media frame is completed.

The session and service established by the SR manager 532 for the split rendering service may suggest a target time for an end-to-end operation, and in an embodiment of the disclosure, the target time may be suggested by the UE 500 or the service provider 550. To satisfy the target computing time on the server 530 out of the total time of the end-to-end operation, the SR manager 532 may operate multiple renderers 542 and multiple encoders 538, and may select one or more results that are completed within the target computing time, or one result that is completed in the fastest time, and deliver the selected results to the packetizer 540.

The packetizer 540 may generate the encoding result (e.g., the media frame) received from the encoder 538 into a form (e.g., one or more packets) for transmission to the UE 500 through the network. In addition to the encoding result, the packetizer 540 may receive an input of pose information (e.g., pose sets or pairs of poses) selected by the server pose manager 534, and SR metadata (e.g., time information regarding the start time and the time taken for rendering of the renderer 542, configuration information regarding the type and form of rendering, the time taken for encoding and rendering, and/or encoding quality information). The packetizer 540 may associate pose information and SR metadata with respect to each media frame and manage the same.

In an embodiment of the disclosure, in case that the packetizer 540 transmits a media frame and the SR metadata through one stream, the packetizer 540 may insert the SR metadata, as a header extension, within the headers of the first and subsequent packets that include the media frame (or at least a part of the media frame) within a payload and deliver the packets to the UE 500. In an embodiment of the disclosure, in case that the SR metadata is transmitted through a second stream separate from the first stream through which the media frame is transmitted, at least one packet of the second stream may include information capable of identifying a media frame associated with the SR metadata transmitted through the first stream (e.g., a sequence number of a packet that includes the media frame associated with the SR metadata within a payload) and the SR metadata.

The UE 500 may receive, through the one or two streams, media frames and pose and SR metadata (e.g., pairs of pose and metadata) associated therewith, may understand the content of the media frames based on the pose and SR metadata, and may perform post-processing on the UE 500 (e.g., UE computing, such as scene composition and/or pose correction).

A media access function (MAF) 510 of the UE 500 may extract media frames and SR metadata from one or more streams received from the server 530 and associate them with each other. The SR metadata may be stored in an SR meta buffer 524, the media frames may be decoded and stored in a media frame buffer 526, and the SR metadata and media frames may be managed in pairs.

A scene manager 512 may position the media frames read from the media frame buffer 526 at logical locations within the space where the UE 500 is located, based on the SR metadata read from the SR meta buffer 524.

A pose corrector 514 may correct the media frames by performing a spatial transformation (e.g., warping) to represent the media frames based on the final actual pose of the UE 500.

The media frames corrected by the pose corrector 514 and the SR metadata for each media frame may be stored in a display frame buffer 516 prior to display. When display of the media frame is required, the SR metadata and target display time may be delivered to a metric collector 518 (e.g., a metric analyzer).

The corrected media frames and the SR metadata for each media frame may be stored in the display frame buffer 516 prior to display. When the media frame is output to a display 520, temporal components taken to render, encode, receive, and display the media frame from the moment at which the display of the media frame is estimated (e.g., a first time point) from the SR metadata may be delivered to the metric collector 518.

The metric collector 518 may receive the SR metadata and generate statistics for SR metadata of which the amount corresponds to recent few pieces or seconds. The metric collector 518 may analyze the SR metadata and generate, as a result of the analysis, the temporal components taken to render, encode, receive, and display the media frame from the moment at which the display of the media frame is estimated (e.g., a first time point). Based on these temporal components, the metric collector 518 may derive the end-to-end time taken to render and display from the pose estimation and identify the most time-consuming processes. A result of analysis by the metric collector 518 (e.g., the temporal components) may be applied to the SR estimator 504 and used to correct T2 time estimation in the SR estimator 504.

Figure 6:
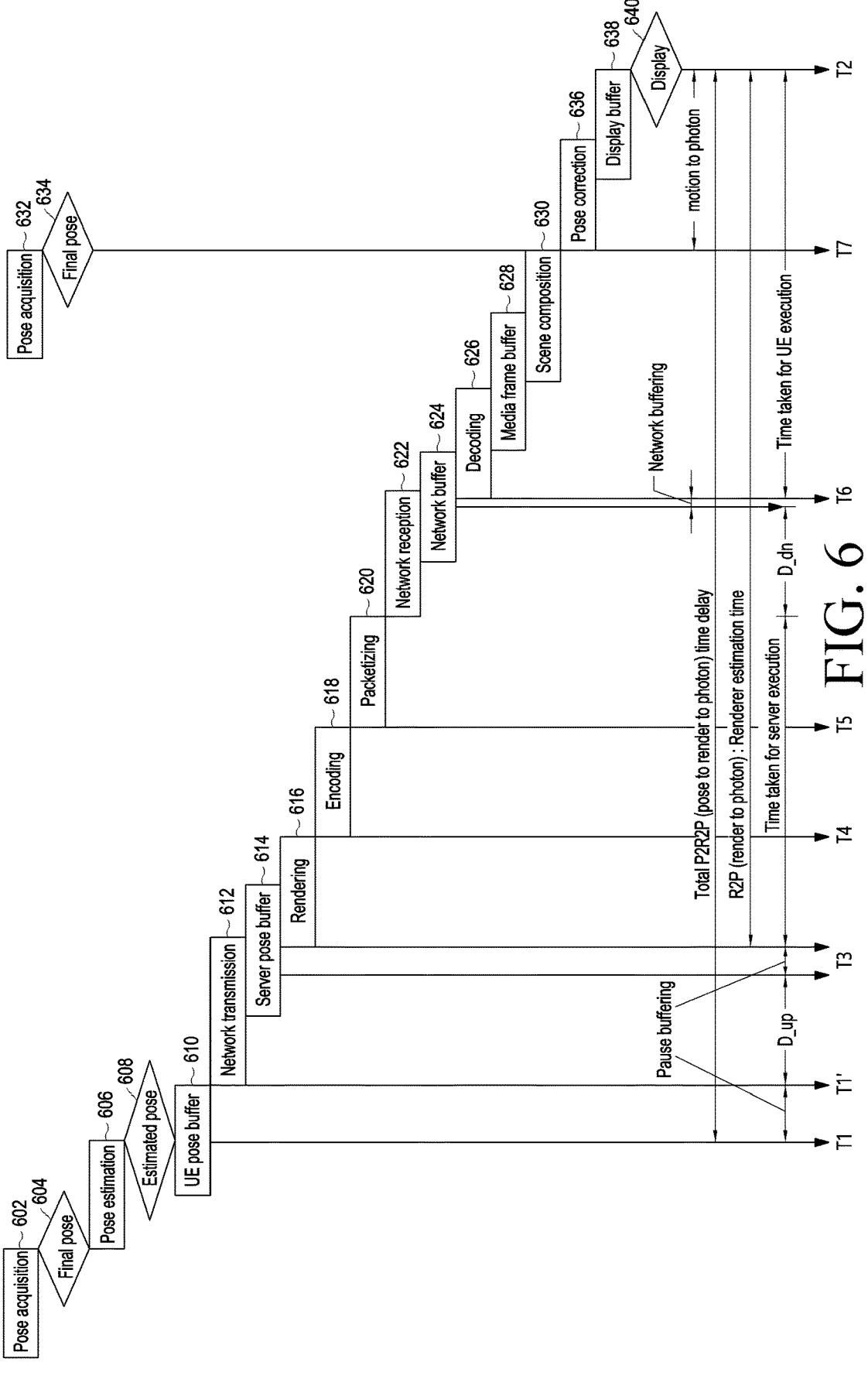
FIG. 6 illustrates components for each stage of split rendering according to an embodiment of the disclosure.

FIG. 6 illustrates components for each stage of split rendering according to an embodiment of the disclosure.

Referring to FIG. 6, a pose acquisition 602 may include an operation of acquiring a pose from the sensor 502. A final pose 604 generated by the pose acquisition 602 may be used in a pose estimation 606 for estimating a future position of the UE (e.g., an estimated pose 608) for a target display time (e.g., estimated T2) that is later than the current time (T1) by a pose-to-render-to-photon (P2R2P) delay. A P2R2P time may be determined as the sum of temporal components to be described later. The temporal components may be obtained in the negotiation stage of the split rendering service and during the actual operation procedure. A pose buffering 610 may include an operation of storing SR metadata including the T1 for which estimation has been made and the estimated T2, and pose pairs including estimated poses, in the UE pose buffer 506. A network transmission 612 (e.g., uplink transmission) may include an operation of transmitting pose sets including one or more pose pairs to the server 530. Each pose set may include a version, which is an identifier capable of identifying the order in which the corresponding pose set has been generated, or a version identifier that indicates a pose set transmission time (T1').

The server 530 may determine, by the version or version identifier, whether the same pose set or pose pair as the previously received pose set or pose pair has been received. Based on the pose set transmission time, the server 530 may determine the transmission order of the corresponding pose set.

A server pose buffering 614 may include storing the pose pairs received by the server pose manager 534 in the server pose buffer 536, deriving a D_up time, which is UE uplink delay time obtained by subtracting T1' from the current time when the pose pairs are stored, and adding the D_up time to the SR metadata associated with the pose pairs. When the renderer 542 finishes rendering of a previous media frame (not shown) and goes into a waiting state, the server pose manager 534 may deliver one pose pair read from the server pose buffer 536 to the renderer 542. At this time, the server pose manager 534 may calculate a render-to-photon (R2P), as a value obtained by subtracting T3, which is the rendering start time, from T2 based on time information (e.g., T2) received from the metric collector 518 of the UE 500. The renderer 542 may add T3, which is a rendering start time, and T4, which is a rendering completion time, to the SR metadata and perform rendering 616 based on the pose pair, and may deliver the media frame, which is a result obtained by performing the rendering, together with the SR metadata to the encoder 538. Upon completion of encoding 618 for the media frame, the encoder 538 may add T5, which is an encoding completion time, to the SR metadata and deliver the media data, which is a result obtained by performing the encoding, together with the SR metadata, to the packetizer 540.

A packetizing 620 may include an operation of generating one or more packets including the media data, which is a result obtained by performing the encoding, and the SR metadata. Network reception 622 (e.g., downlink reception) may include an operation in which the MAF 510 of the UE 500 receives the one or more packets from the server 530 through one or more streams.

A network buffering 624 may include an operation in which the MAF 510 associates media frames and SR metadata with each other, obtained from the packets received from the server 530, and stores the same in the media frame buffer 526 and the SR meta buffer 524, respectively. The MAF 510 may add, to the SR metadata, time T6 indicating when a decodable frame has been received from the packets. A media frame buffering 628 may include an operation of storing media frames resulting from the decoding 626 in the media frame buffer 526.

A scene composition 630 may be performed by the scene manager 512. Immediately after performing the scene composition 630, a pose correction 636 may be performed at a time point T7 based on a final pose 634 obtained by the UE 500 via a pose acquisition 632, and a final correction result of the pose correction 636 may be added to a display frame buffer 516 via a display frame buffering 638. A display 640 of the final correction result may be output at the actual display time (actual T2). The metric collector 518 may add the actual T2 to the SR metadata. The metric collector 518 may derive at least one of a time point at which the pose estimation has been performed (T1), an estimated P2R2P (estimated T2–T1), a time point at which the pose has been transmitted (T1'), a pose transmission time (D_up), a rendering start time point (T3), a time taken for rendering (T4-T3), a time taken for encoding (T5-T4), a frame transmission time (T6-T5), or a UE processing time (T2-T6). The metric collector 518 may compare the estimated P2R2P (estimated T2–T1) with the actual P2R2P (actual T2-T1) to derive the P2R2P to be used for the next estimation.

In an embodiment of the disclosure, the SR metadata may be generated in a state of including only T1 and T2 for a pair of poses, and may include additional values as the processes (e.g., operations 614, 616, 618, 622, and 640) proceed. In an embodiment of the disclosure, the SR metadata may be transmitted from the server 530 to the UE 500 by including statistic values generated from previous poses in fields T1 to T7.

The SR manager 532 may obtain a value of the P2R2P time from reporting by the metric collector 518 of the UE 500 or identify a value of the P2R2P time based on the statistics of the SR metadata described in the pose set, and may determine whether the P2R2P time is appropriate for the needs of the UE 500 or the service provider 550. When the P2R2P time is determined as not being suitable for the needs of the UE 500 or the service provider 550, the SR manager 532 may change configurations of the renderer 542 and the encoder 538, or may use the results of the renderer and encoder that are generated faster among two or more renderers and/or two or more encoders using two or more different configurations. The SR manager 532 may change configurations of the renderer 542 and encoder 538 to enable faster processing of media data (e.g., scene management and pose correction) on the UE 500 based on a time taken for the UE 500. For example, the SR manager 532 may configure the renderer 542 and encoder 538 to generate media frames at a lower resolution to reduce a time taken for rendering and encoding, and the renderer 542 may generate processing hint information including depth and occupancy images together with media data including 2D images to reduce processing time on the UE 500, and provide the media data and processing hint information to the UE 500. The UE 500 may reduce a time to detect an image from the received media data for processing based on the processing hint information.

Figure 7:
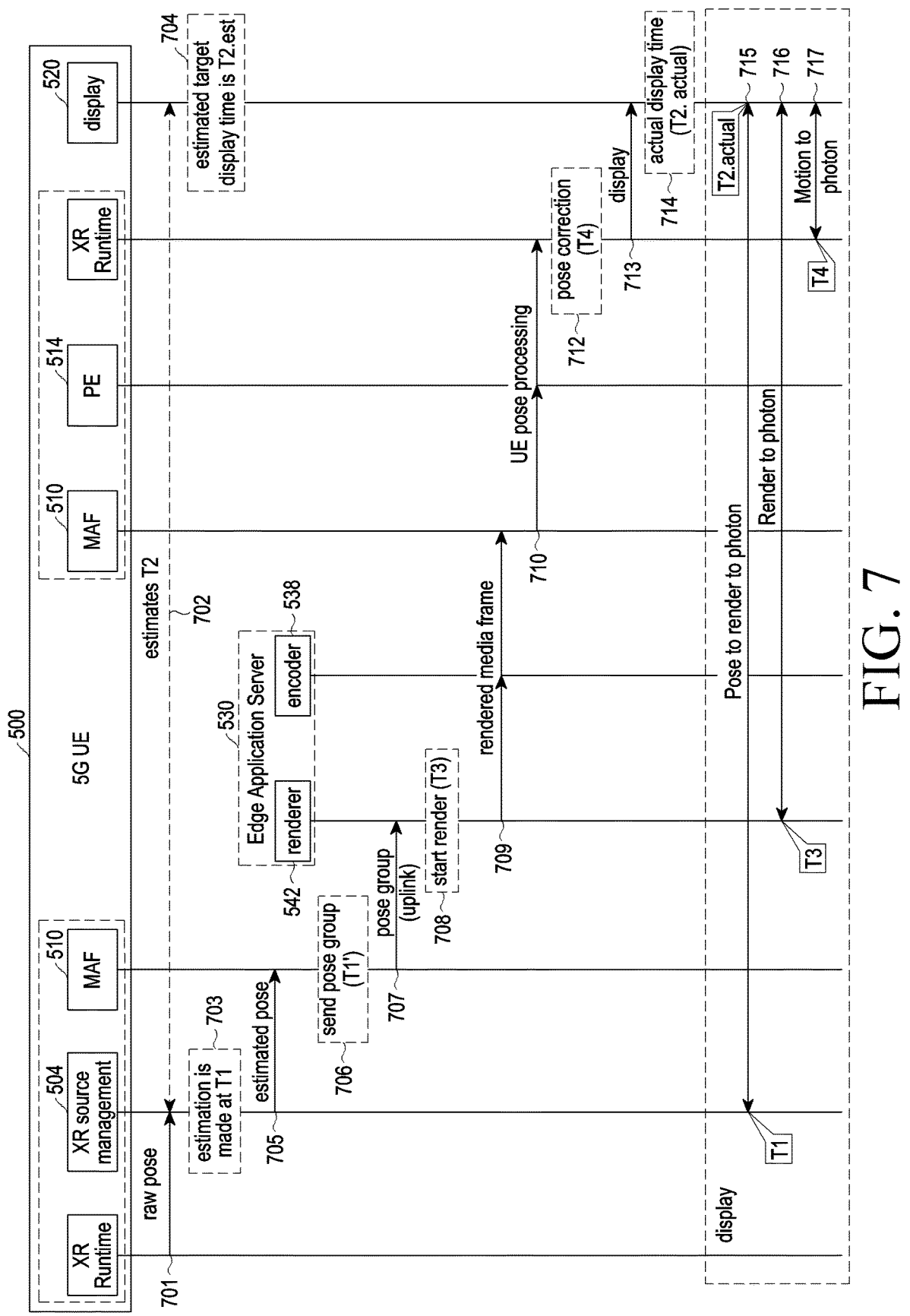
FIG. 7 is a sequence diagram illustrating components for each stage of split rendering according to an embodiment of the disclosure.

FIG. 7 is a sequence diagram illustrating components for each stage of split rendering according to an embodiment of the disclosure.

Referring to FIG. 7, operations 701, 702, 703, 704, 705, 706, 707, 708, 709, 710, 711, 712, 713, and 714 may correspond to components for each stage 602, 604, 606, 608, 610, 612, 614, 616, 618, 620, 622, 624, 626, 628, 630, 632, 634, 636, 638, and 640 of FIG. 6. Operation 715 include pose to render to photon T1 to T2.actual between XR source management 504 and display 520. Operation 716 includes render to photon between renderer 542 and display 520. Operation 717 includes motion to photon between XR runtime and display 520.

According to an embodiment of the disclosure, the UE 500 may transmit an estimated pose for an estimated target display time to the server 530, to perform split rendering service. The UE 500 also receives, from the server 530, a rendered media frame together with metadata (e.g., SR metadata) that includes a pose used to generate the media frame. The current MeCAR PD v0.4 describes a user pose as a pose and a time, but it is unclear whether the time may be interpreted as the pose acquisition time or the target display time.

To make an accurate estimation of the target display time, the UE 500 may refer to a statistical record of delays, which have been previously estimated and actually happened. The estimated delay is a gap between the time when the estimation has been made (T1 in FIG. 7) and the estimated target display time (T2.estimated or T2.est). The actual delay that actually happened is the gap between the time when the estimation has been made (T1) and the time when a photon has been displayed (T2.actual).

When the UE 500 transmits two or more poses (e.g., a pose group) at a time, the pose group may be considered as a sequence of a pair of a pose and metadata containing multiple pieces of time information. When the UE 500 intends to overwrite some of the poses, which have been updated using the most recent estimation parameters, among poses that have been already transmitted, the server 530 may identify a version between the poses or groups of poses received from the UE 500. When the pose has not yet been rendered, the server 530 may replace a pose for the same target display time by a pose or group of poses having a more recent T1'.

When the frequency of the poses stored in the server pose buffer 536 is more (dense) than the frame reproducing frequency of the UE 500, split rendering may select a pose closest to the render-to-photon time. The render-to-photon time of the most recent frame information may assist the server 530 in selecting an appropriate pose.

The UE 500 may transmit the group of poses to a split rendering function (SRF) of the server 530 (e.g., the renderer 542 and the encoder 538), and the server 530 (e.g., the SRF) may generate rendered media frames based on the poses in the group of poses. Each pose may be associated with temporal metadata, such as a time when the pose estimation has been made (T1), an estimated target display time for the content (T2.estimated), and a time when the pose group has been transmitted (T1').

The gap between the actual display time (T2.actual) and the time when the estimation has made (T1) is the pose-to-render-to-photon (P2RTP) delay, which allows the UE 500 to know the amount of processing time and connection delay for the split rendering loop. The next pose estimation may refer to the pose-to-render-to-photon delay for the estimation of the new T2.estimated.

The split rendering of the server 530 may refer to T1'. T1' is a time when a group of poses is transmitted from the UE 500, when more than one pair of pose and metadata for the same target display time are received from the UE 500. T1' may be used by the server 530 to manage poses, for example, allowing the UE to update previous estimated information (e.g., estimated poses) by resubmitting new poses having the same target display time.

The server 530 may transmit rendered media frames and associated metadata to the UE 500 via a split rendering function. The metadata may include time information associated with the pose used for rendering (e.g., T1 and/or T2.estimated) and the time when the rendering has started (T3) by the renderer 542, and may be used by the UE 500 to measure the render-to-photon (R2P) delay.

In an embodiment of the disclosure, the pose and metadata information transmitted from the UE 500 may include at least one of the following parameters:

Pose;
Estimated-at-time (T1);
Estimated-target-display-time (T2.estimated);
Sent-at-time (T1'); or
Render-to-photon-time (T2.actual-T3).

In an embodiment of the disclosure, the pose and metadata information associated with the media frame transmitted from the server 530 may include at least one of the following parameters:

Pose;
Estimated-at-time (T1);
Estimated-target-display-time (T2.estimated); or
Start-to-render-at-time (T3).

FIG. 8 illustrates an information structure of a pose set according to an embodiment of the disclosure.

Referring to FIG. 8, a pose set 800 may include at least one of timePoseSetSent, numberOfPosePair, earliestDeadline (estimated T2earlist), latestDeadline (estimated T2latest), or posePair[ ].

The timePoseSetSent is time (T1') immediately before the pose set is transmitted from the UE 500 to the server 530.

The numberOfPosePair indicates the number of pose pairs described in the pose set.

The earliestDeadline indicates the estimated pose time of the pose pair that arrives first among the pose pairs.

The latestDeadline indicates the estimated pose time of the pose pair that arrives last among the pose pairs.

The posePair indicates one or more pose pairs that include the estimated pose.

In an embodiment of the disclosure, the UE 500 may transmit multiple pose pairs instead of the pose set 800. Each pose pair may be transmitted together with a pose pair identifier. The UE 500 may store all of the transmitted pose pairs until a media frame is received, and then, when the media frame is received, compare the pose pairs by using the pose pair identifier to determine whether the estimation has been successful (compare the estimated T2 with the actual T2) and refine the factors used in the estimation.

FIG. 9 illustrates an information structure of a pose pair according to an embodiment of the disclosure.

Referring to FIG. 9, a pose pair 900 may include at least one of estimatedPose or srMetadata.

The estimatedPose may refer to a pose estimated by the UE 500, and may include poseType and pose[ ].

The poseType is a representation of the estimatedPose, and may indicate a quaternion or indicate a position (xyz) and orientation (rpy: roll, pitch, and yaw).

The srMetadata refers to metadata associated with the estimatedPose.

FIG. 10 illustrates an information structure of SR metadata according to an embodiment of the disclosure.

Referring to FIG. 10, the SR metadata (e.g., srMetadata 1000) may include at least one of timePoseEstimated (T1), timePoseSetSent (T1'), timeEstimatedDisplayTarget (T2 estimated), timeActualDisplay (T2 actual), timeRenderStarted (T3), timeRenderFinished (T4), timeEncodeFinished (T5), timeFrameReceive (T6), timeLateStageReprojection (T7), or timeRenderToPhotonPercentile[ ].

The timePoseEstimated refers to a time point at which pose estimation has been performed (T1).

The timePoseSetSent (T1') of the posePair has the same value as the timePoseSetSent of the poseSet to which the posePair belongs. The server 530 may use the value of timePoseSetSent to determine the transmission order of the poseSet and store the poseSet in the server pose buffer 536. In addition, when two different posePairs having the same value of timeEstimatedDisplayTarget exist, the server 530 may use timePoseSetSent to identify a poseSet from which each posePair comes. Among the two posePairs, the one having a larger value of timePoseSetSent is a newer estimated value and therefore has a higher priority. For example, the posePair included in the previously transmitted poseSet may be deleted.

The timeEstimatedDisplayTarget refers to the estimated target display time (estimated T2) used for the pose estimation above.

The timeActualDisplay refers to the actual display time (actual T2) of the pose that has been estimated at the time point T1.

The timeRenderStarted refers to a time point at which rendering for a media frame has started (T3). The metric collector 518 of the UE 500 may use the value of timeRenderStarted to identify the actual R2P time.

The timeRenderFinished refers to a time point at which rendering for the media frame has finished (T4).

The timeEncodeFinished refers to a time point at which encoding for the media frame has finished (T5).

The timeFrameReceived refers to a time point at which the media frame has been received in decodable units (T6).

The timeLateStageReprojection refers to a time point at which the media frame is corrected according to the actual final pose of the UE 500 (T7).

The timeRenderToPhotonPercentile refers to a statistic of the render-to-photon (R2P) time for the previous time points (e.g., just before, P50, P90, P95, and P99).

Figure 11:
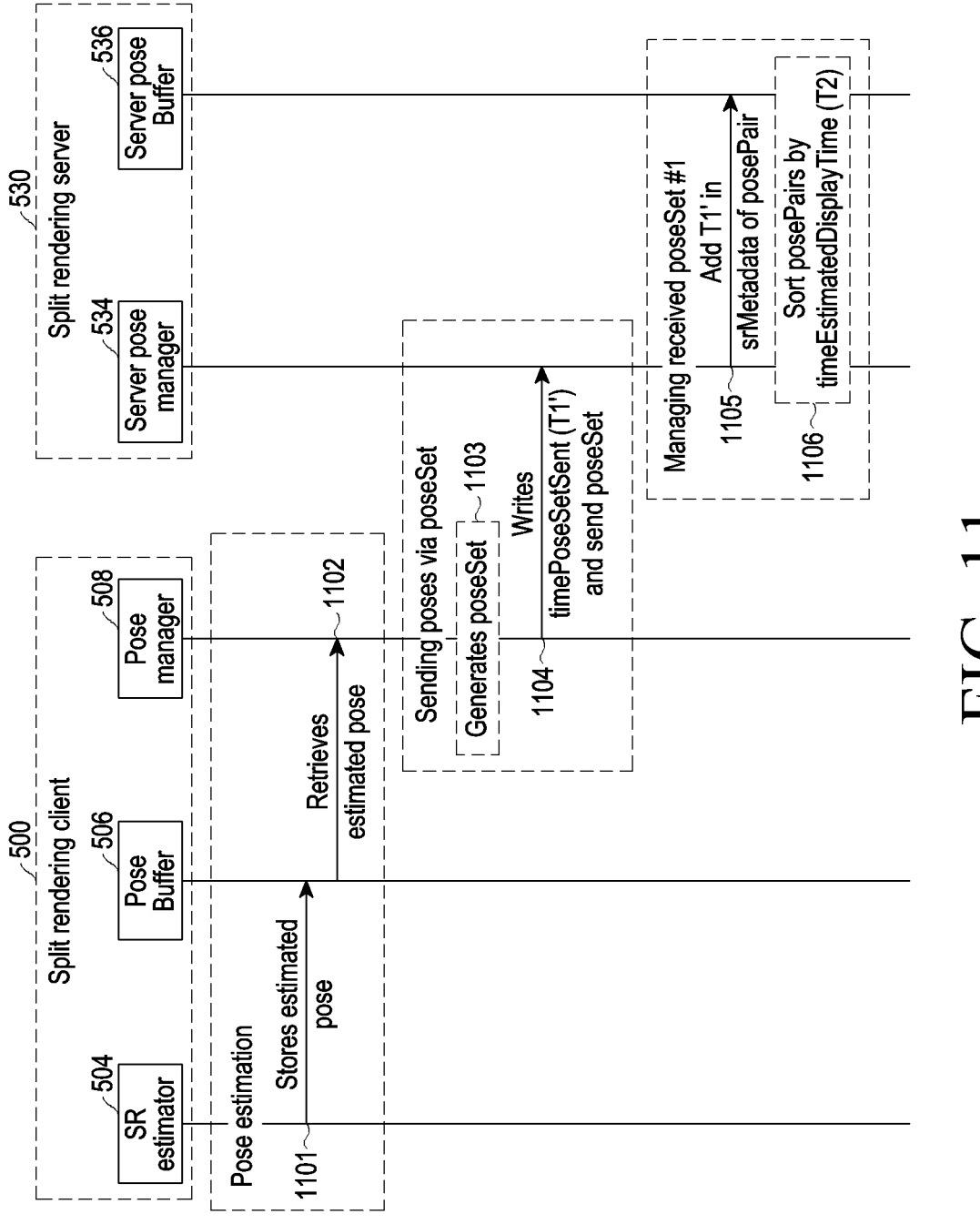
FIG. 11 is a sequence diagram illustrating updating of pose sets according to an embodiment of the disclosure.

FIG. 11 is a sequence diagram of illustrating updating of pose sets according to an embodiment of the disclosure.

Referring to FIG. 11, the UE 500 including a split rendering client may continuously obtain the current pose of the UE 500 from the sensor 502, and estimate the time point of T2 and a pose of the T2 time point by using the SR estimator 504.

In operation 1101, the estimated pose may be stored in the pose buffer 506.

In operations 1102, 1103, and 1104, the UE pose manager 508 may transmit the estimated poses stored in the pose buffer 506 to the server 530 for each specific time point.

In an embodiment of the disclosure, in operation 1104, the UE pose manager 508 may transmit a pose set including timePoseSetSent (T1) to the server 530.

In operation 1105, the server pose manager 534 may add T1' to the SR metadata of the pose pairs in the received pose set (e.g., pose set #1) and store the pose set #1 in the server pose buffer 536.

In operation 1106, the server pose buffer 536 may sort and store the pose pairs according to the timeEstimatedDisplay-Target (T2).

In an embodiment of the disclosure, estimated poses which have already been delivered by the UE 500 to the server 530 for the same target display time may be corrected. In an embodiment of the disclosure, regardless of whether a communication path between the UE 500 and the server 530 ensures transmission order, the server 530 may determine the transmission order of the poses transmitted by the UE 500, as described below.

To enable the server 530 to determine the transmission order of the poses transmitted by the UE 500, the UE 500 may bundle multiple estimated poses to be transmitted and transmit them in the form of a repository called a pose set ("poseSet"). As shown in FIG. 8, the poseSet 800 includes timePoseSetSent, and the timePoseSetSent may be listed at time T1', which is immediately before the poseSet 800 is generated and transmitted by the UE pose manager 508. In an embodiment of the disclosure, when timePoseSetSent is not listed within the poseSet 800, the server pose manager 534 may consider the value of the transmission timestamp of the packet containing poseSet 800 to be timePoseSetSent.

The server pose manager 534 may extract posePairs (e.g., the posePair 900) from the received poseSet 800 and store them in the server pose buffer 536. In an embodiment of the disclosure, the timePoseSetSent field of the srMetadata (e.g., srMetadata 1000) within the posePair 900 is configured as a value of timePoseSetSent corresponding to the poseSet 800 to which posePair 900 belongs. At a time point at which the server pose manager 534 has received the poseSet 800, non-empty fields among fields in the srMetadata 1000 are timePoseEstimated and timeEstimatedDisplayTarget, and other fields may be empty because they have not yet arrived or duplicated with timePoseSetSent. The posePairs stored in the server pose buffer 536 may be processed such that a value of timePoseSetSent is filled and the posePairs are sorted in the order of timeEstimatedDisplayTarget.

Figure 12:
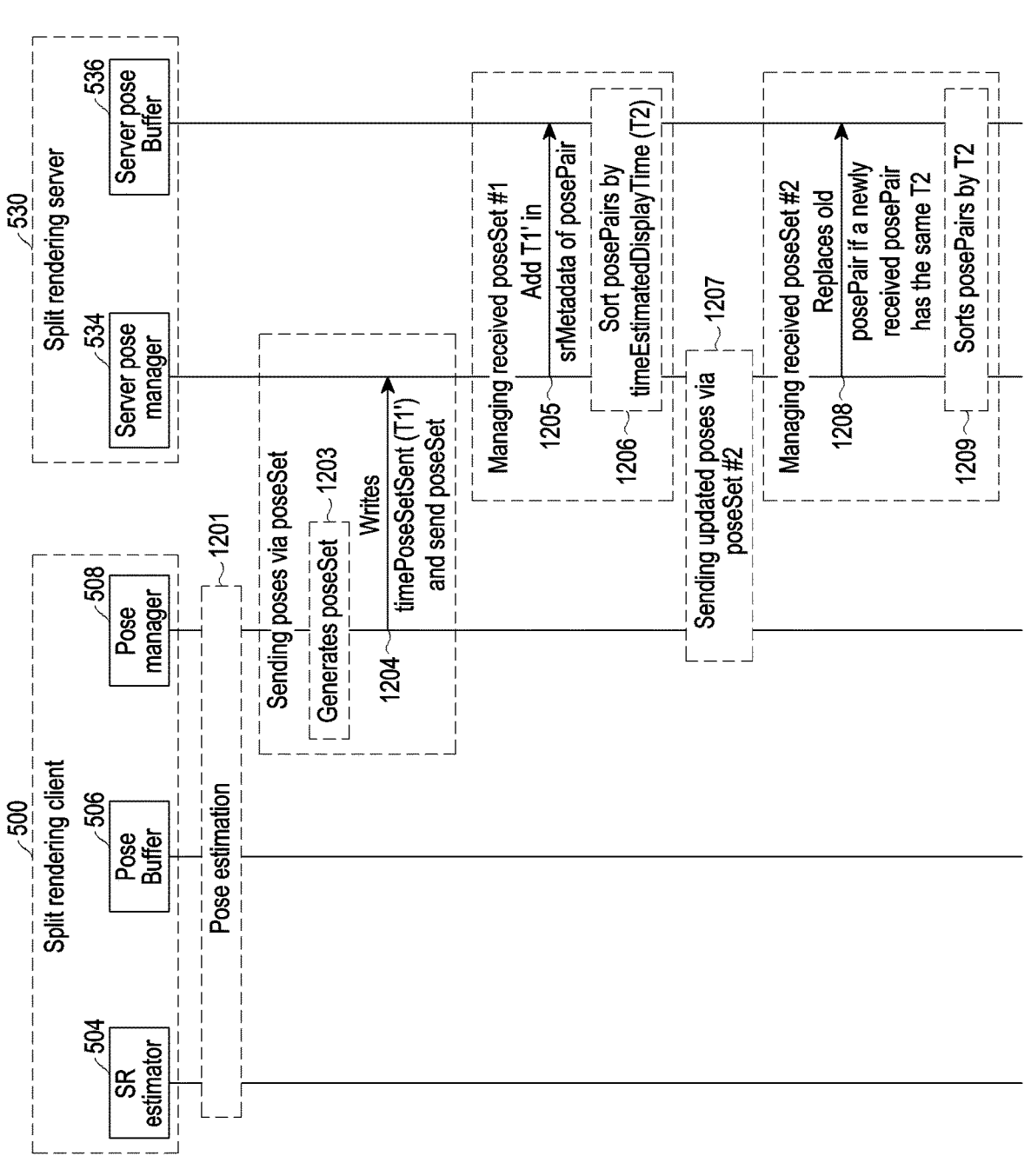
FIG. 12 is a sequence diagram illustrating correction of an estimated pose according to an embodiment of the disclosure.

FIG. 12 is a sequence diagram illustrating correction of an estimated pose according to an embodiment of the disclosure.

Referring to FIG. 12, the UE 500 (e.g., the SR estimator 504) may estimate a pose in operation 1201, and may generate a pose set (e.g., pose set #1) including the estimated pose in operation 1203.

In operation 1204, the pose set #1 including timePoseSetSent (T1') may be transmitted to the server 530 by the UE pose manager 508 of the UE 500.

In operation 1205, the server pose manager 534 may add T1' to the SR metadata of the pose pair of the pose set #1.

In operation 1206, the server pose manager 534 may sort the pose set #1 according to the timeEstimatedDisplayTarget (T2) and store the same in the server pose buffer 536.

In operation 1207, the UE 500 (e.g., the UE pose manager 508) may transmit a pose set #2 including a new estimated pose using new estimation parameters to the server 530, in order to correct the already transmitted estimated pose (e.g., pose set #1) into the new estimated pose.

In operation 1208, the server pose manager 534 may replace an existing pose pair (e.g., pose set #1), which has the same T2 as the newly received pose pair (e.g., pose set #2), by the newly received pose pair.

In operation 1209, the server pose manager 534 may sort the pose set #2 according to the timeEstimatedDisplayTarget (T2) and store the same in the server pose buffer 536.

A second poseSet (e.g., poseSet #2) that is retransmitted to correct the already transmitted first poseSet (e.g., poseSet #1) may include a second posePair that has the same timeEstimatedDisplayTarget as the first posePair included in the first poseSet. After storing the posePairs of the first poseSet in the server pose buffer 536, the server pose manager 534 may consider the second posePair to be a duplicate of the first posePair having the same timeEstimatedDisplayTarget in relation to storing the posePairs of the second poseSet in the server pose buffer 536. The server pose manager 534 may compare the information of the timePoseSetSent of the first posePair and the second pose-Pair to determine that the one having the larger value (e.g., the second posePair) has been transmitted more recently by the UE 500, and may determine that the intent of the UE 500 to transmit the second posePair is to correct a previous estimation (e.g., the first posePair). The server pose manager 534 may replace the first posePair of the first poseSet, which has been transmitted first and stored in the buffer, by the second posePair of the second poseSet.

Figure 13:
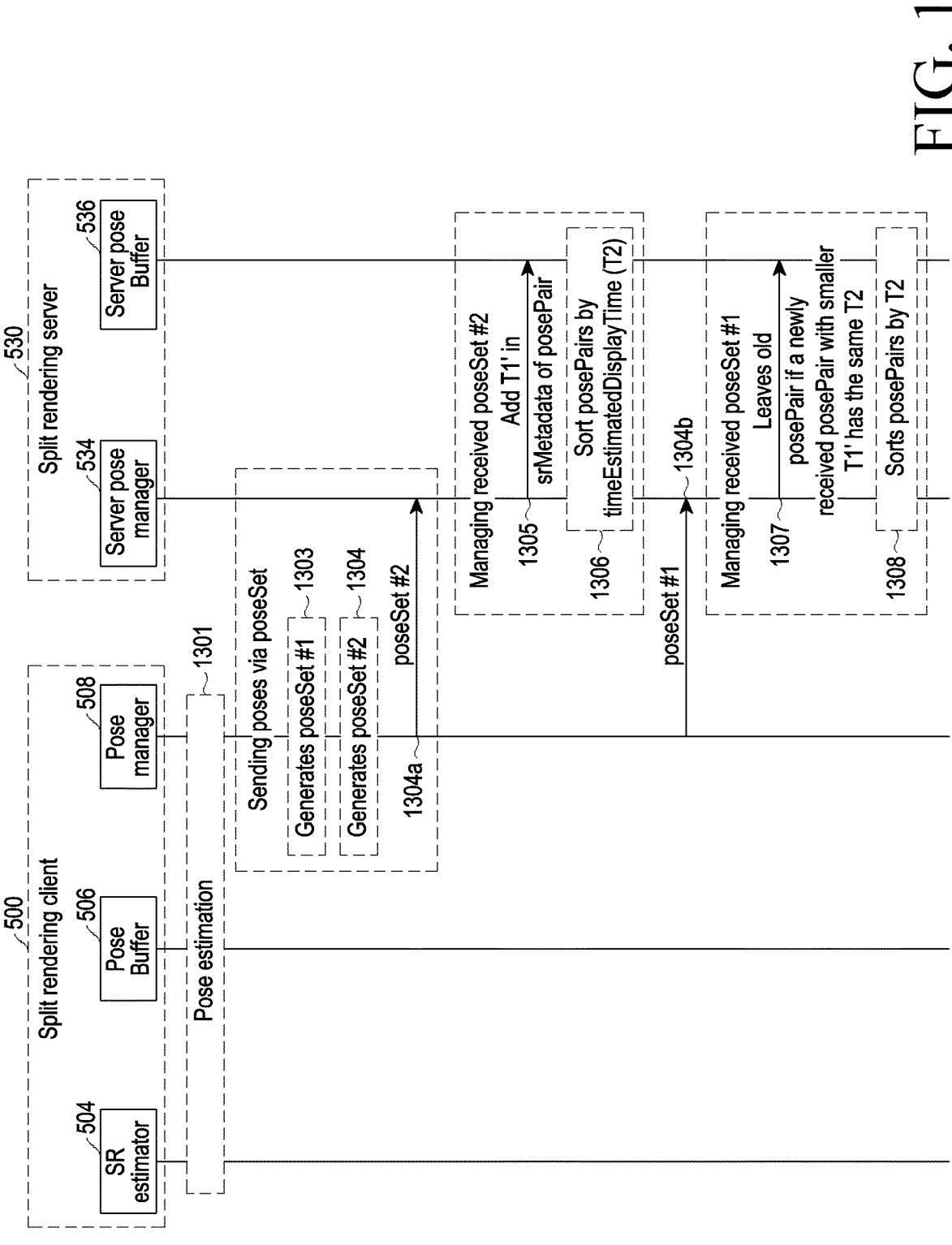
FIG. 13 is a sequence diagram illustrating a reversal of an order of an estimated pose according to an embodiment of the disclosure.

FIG. 13 is a sequence diagram illustrating a reversal of an order of an estimated poses according to an embodiment of the disclosure.

Referring to FIG. 13, the UE 500 (e.g., the SR estimator 504) may estimate poses in operation 1301, and may generate pose sets (e.g., pose set #1 and pose set #2) that include the estimated poses in operations 1303 and 1304, respectively.

In operation 1304a, the later generated pose set #2 may be first transmitted to the server 530 by the UE pose manager 508 of the UE 500.

In operation 1305, the server pose manager 534 may add T1' to the SR metadata of the pose pair of the pose set #2.

In operation 1306, the server pose manager 534 may sort the pose set #2 according to the timeEstimatedDisplayTarget (T2) and store the same in the server pose buffer 536.

When a communication path, in which the transmission order of the packets is not guaranteed, is used between the UE 500 and the server 530, the first poseSet (e.g., poseSet #1) sent first by the UE 500 may arrive at the server 530 later than the second poseSet (e.g., poseSet #2) in operation 1304b.

In operation 1307, the server pose manager 534 may store the posePairs of the first poseSet in the server pose buffer 536.

As the server pose manager 534 processes the posePairs of the first poseSet after the posePairs of the second poseSet are stored in the server pose buffer 536, the server pose manager 534 may identify the order of transmission of the posePairs (e.g., the first posePair) that have the same timeEstimatedDisplayTarget as the previously stored posePairs (e.g., the second posePair). The server pose manager 534 may compare the timePoseSetSent of the first posePair and the second posePair with each other to determine that the one having the larger value (e.g., the second posePair) has been transmitted later by the UE 500, and may determine that the arrival order of the first posePair and the second posePair has been reversed during the transmission process.

In operation 1308, the server pose manager 534 may determine that the second posePair of the second poseSet that has been received earlier and stored in the server pose buffer 536 will not be replaced by the first posePair of the first poseSet that has been received later.

According to an embodiment of the disclosure, a 5G media service enabler (MSE) of 3GPP SA4 (e.g., SR_MSE) is an enhanced MSE for supporting multimedia services through 5G networks. The 5G MSE builds on existing MSEs to provide advanced multimedia functions, such as improved video and audio quality, low latency, and high stability, and may support the requirements of 5G services and applications. The 5G MSE may provide end-to-end multimedia services through 5G networks, including support for 5G-defined Internet protocol (IP) multimedia subsystem (IMS), by utilizing functions of 5G networks, such as network slicing. The relevant 3GPP specifications for 5G MSE are part of 3GPP Release 16 and subsequent releases.

The split rendering media service enabler (SR_MSE) may support split rendering based on the 5G MSE. The architecture of the UE and server to provide the function of split rendering and the requirements of the API for applications to provide the above function are discussed.

Figure 14:
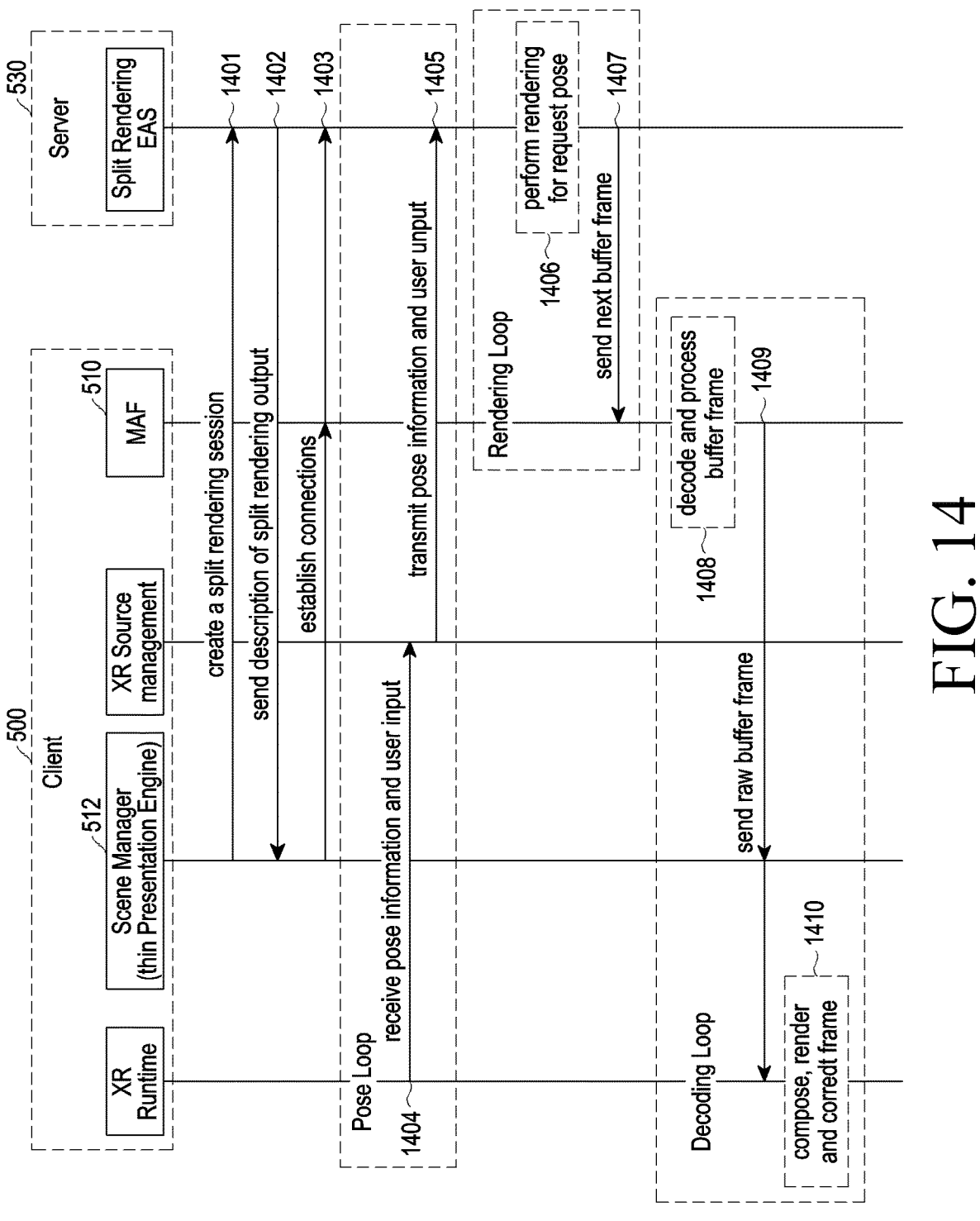
FIG. 14 is a sequence diagram illustrating a procedure for split rendering between a UE and a server according to an embodiment of the disclosure.

FIG. 14 is a sequence diagram illustrating a procedure for split rendering between a UE and a server according to embodiment of the disclosure. The illustrated procedure may be defined in SR_MSE (TS 26.565 v0.2.0 2022-11).

Referring to FIG. 14, in operation 1401, the UE 500 (e.g., the scene manager 512) may establish a split rendering session with the server 530 (e.g., SREAS).

In operation 1402, the server 530 may transmit a description of the output of split rendering (e.g., a rendered result) to the UE 500 (e.g., the scene manager 512).

In operation 1403, the UE 500 (e.g., the scene manager 512) may establish a connection with the server 530.

In operation 1404, the UE 500 (e.g., an XR runtime module) may deliver user input and pose information including estimated poses to an XR source management module (e.g., the SR estimator 504) of the UE 500.

In operation 1405, the UE 500 (e.g., the XR source management module) may transmit the pose information and user input to the server 530.

In operation 1406, the server 530 may perform rendering for a requested pose based on the pose information and user input.

In operation 1407, the server 530 may transmit a next buffer frame (e.g., a media frame) to the UE 500 (e.g., the MAF 510).

In operation 1408, the UE 500 (e.g., the MAF 1408) may perform decoding and processing of the media data of the buffer frame.

In operation 1409, the UE 500 (e.g., MAF 510) may transmit a media frame (e.g., a raw buffer frame) generated as a result of the decoding and processing to the XR runtime module via the scene manager 512.

In operation 1410, the UE 500 (e.g., the XR runtime module) may compose, render, correct, and display the raw buffer frame.

Figure 15A:
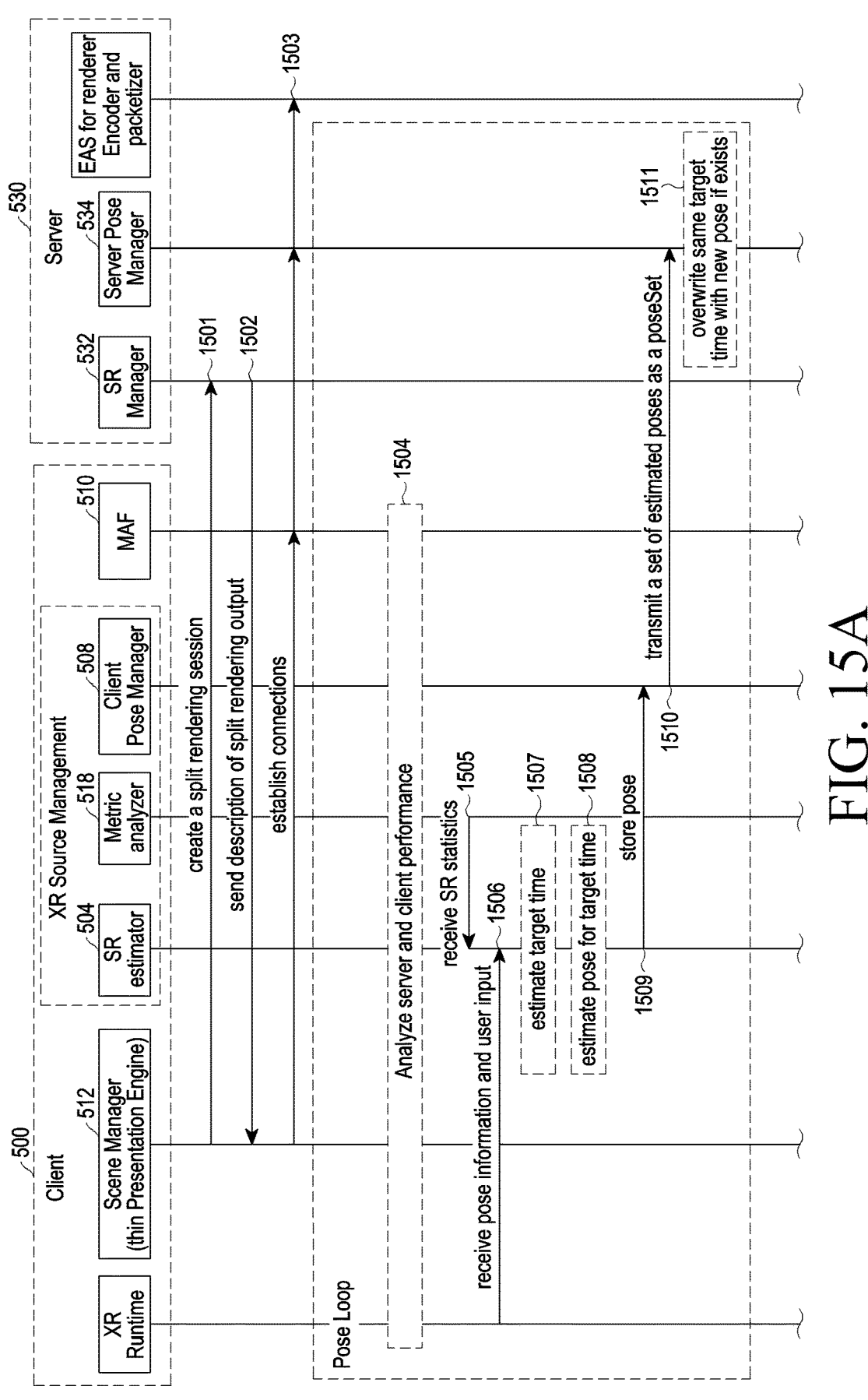
FIGS. 15A and 15B are a sequence diagram illustrating a procedure for split rendering between a UE and a server according to various embodiments of the disclosure.
Figure 15B:
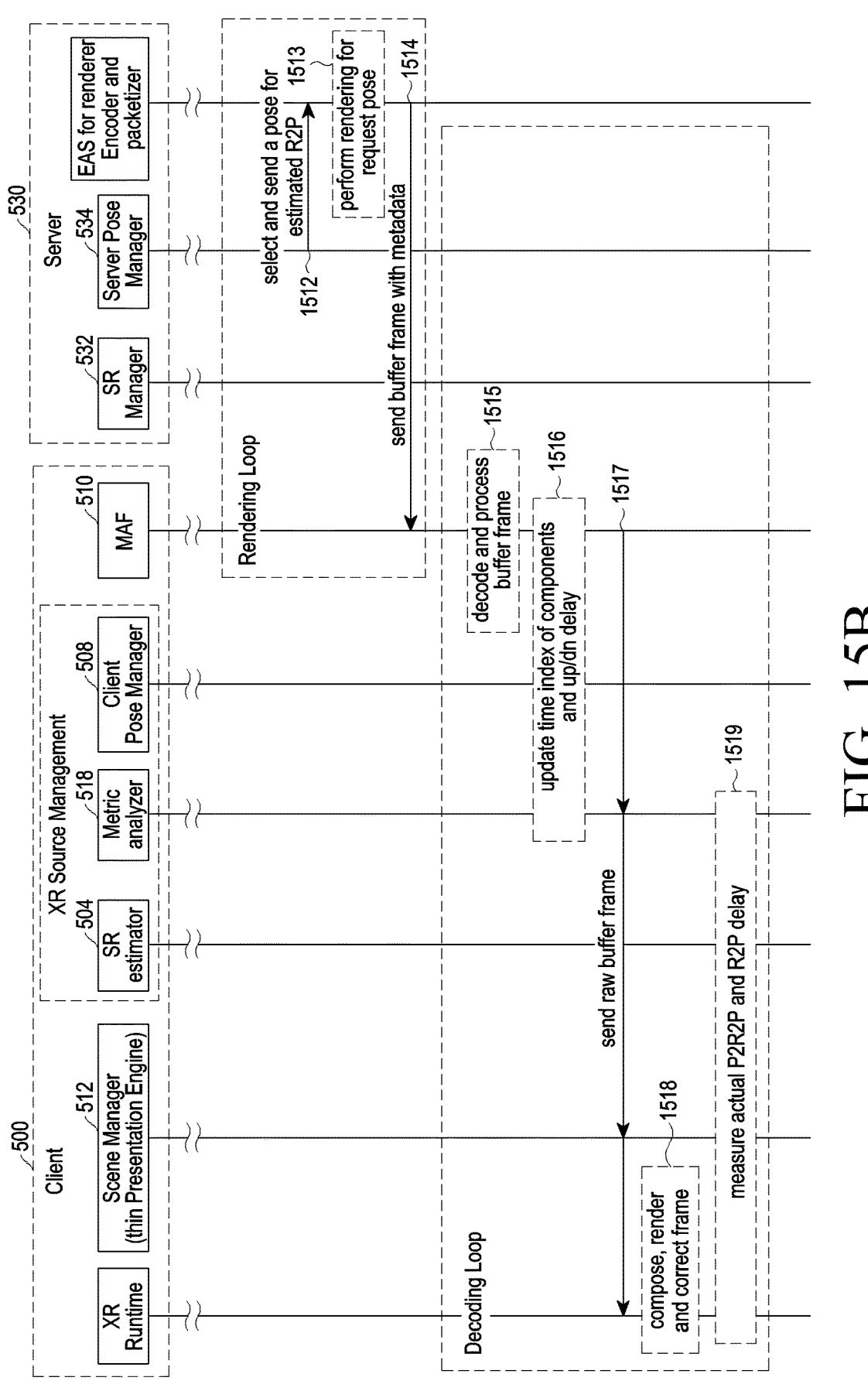

FIGS. 15A and 15B are a sequence diagram illustrating a procedure for split rendering between a UE and a server according to various embodiments of the disclosure.

Referring to FIGS. 15A and 15B, in operation 1501, a session (e.g., a split rendering session) may be established between the scene manager 512 (e.g., a scene presentation engine) of the UE 500 (e.g., a split rendering client) and the SR manager 532 of the server 530.

In operation 1502, the server 530 (e.g., the SR manager 532) may provide the UE 500 (e.g., the scene manager 512) with a description including attributes and association information for a media frame that is the output of rendering (e.g., a rendered result).

In operation 1503, the UE 500 (e.g., the scene manager 512 and the MAF 510) may establish connections with the server 530 (e.g., the server pose manager 534 and the packetizer 540) for network transmission (e.g., uplink transmission) and for reception of the media frame (e.g., downlink reception).

In operation 1504, the UE 500 (e.g., the metric collector 518) may collect and analyze metrics related to server and client performance (e.g., at least one of network transmission speed, central processing unit (CPU)/graphic processing unit (GPU) processing speed, media processing speed, or media frame attribute information) from the server 530 and/or the UE 500.

In operation 1505, performance metric values (e.g., SR statistics) associated with the split rendering may be delivered from the metric collector 518 to the SR estimator 504 of the UE 500.

In operation 1506, pose information and user input obtained from the UE 500 (e.g., the XR runtime module) may be delivered to the SR estimator 504.

In operation 1507, the SR estimator 504 may estimate a target display time (T2) based on a pose according to the pose information and user input and the performance metric values.

In operation 1508, the SR estimator 504 may estimate a pose for the T2 time.

In operation 1509, the estimated pose may be delivered to the UE pose manager 508, and may be stored in the pose buffer 506.

In operation 1510, the stored poses (e.g., a set of estimated poses) may be transmitted to the server pose manager 534 in the form of a pose set.

In operation 1511, when, among the pose pairs in the received pose set, there is a pose pair (e.g., a new pose pair) having the same T2 as a pose pair (e.g., a previous pose pair) already stored in the server pose buffer 536, the server pose manager 534 may overwrite the previous pose pair with the information of the new pose pair.

In operation 1512, the server pose manager 534 may select at least one pose pair from among the pose pairs stored in the server pose buffer 53 based on the performance metric values of the server 530 and the UE 500, and deliver the pose of the selected pose pair to the renderer 542.

In operation 1513, the server 530 (e.g., the renderer 542, the encoder 538, and the packetizer 540) may perform rendering, encoding, and packetizing based on the selected pose.

In operation 1514, the server 530 (e.g., the packetizer 540) may transmit the media frame that is a result of rendering and the SR metadata related thereto to the UE 500 (e.g., the MAF 510). (e.g., downlink transmission).

In operation 1515, the UE 500 (e.g., the MAF 510) may decode the media frame and SR metadata received from the server 530 and store the media frame and SR metadata in the media frame buffer 526 and the SR meta buffer 524.

In operation 1516, the metric collector 518 may calculate components of multiple time metrics and update statistics on time spent for each component.

In operation 1517, buffer data read from the media frame buffer 526 and the SR meta buffer 524 may be delivered to the metric collector 518, the scene manager 512, and the XR runtime module (e.g., the pose corrector 514).

In operation 1518, the XR runtime module (e.g., the pose corrector 514) may compose a scene based on the buffer data and perform rendering, and may perform pose correction to correct differences between estimated poses and actual poses.

In operation 1519, the UE 500 (e.g., the metric collector 518) may measure the actual P2R2P delay and R2P delay based on the displayed result.

In a wireless communication system according to an embodiment of the disclosure, the server 530 may transmit IP packets including encapsulated media frames to the UE 500, by using a real time transport protocol (RTP) or secure RTP (SRTP).

Figure 16:
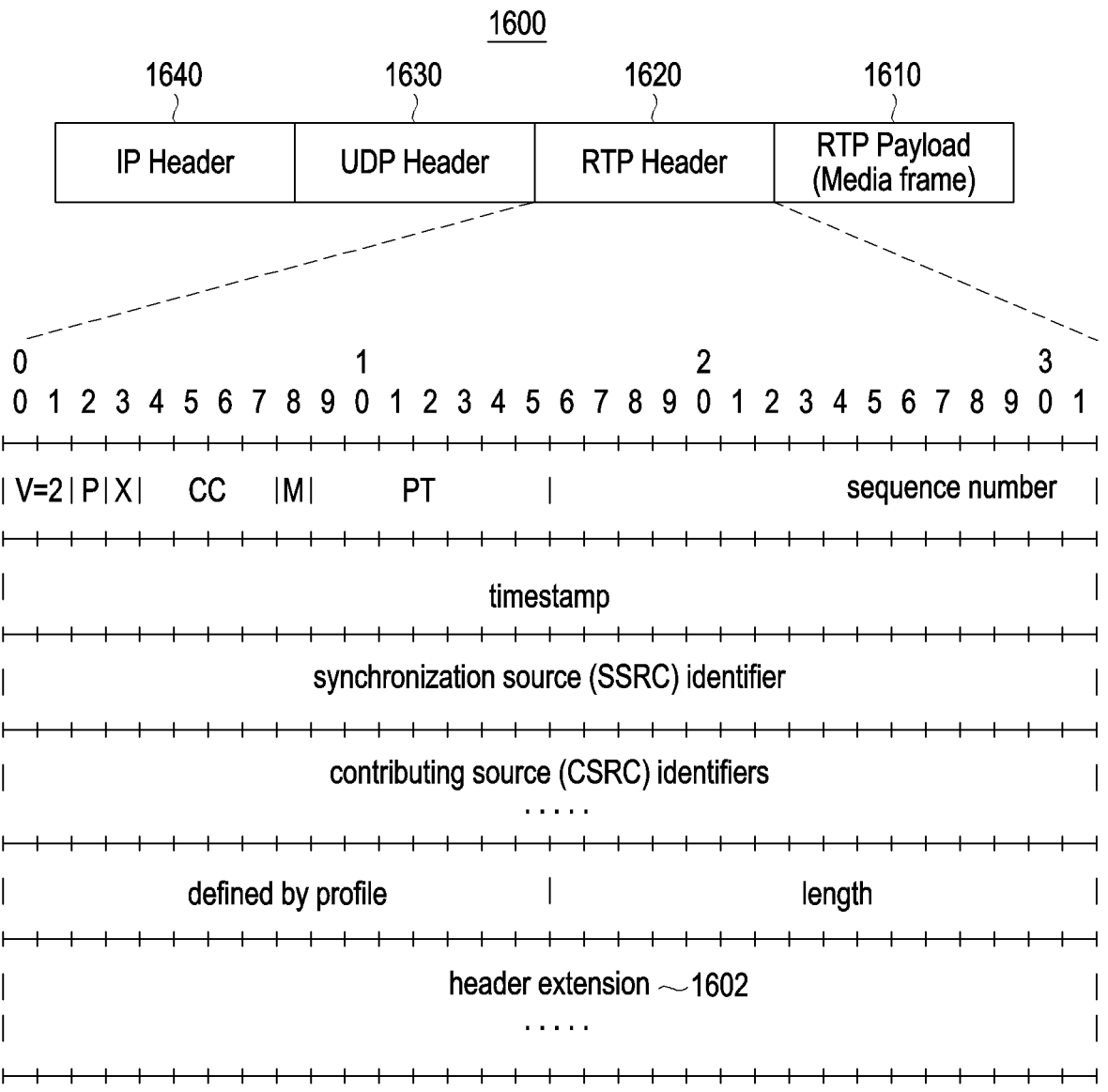
FIG. 16 is a conceptual diagram illustrating an Internet protocol (IP) packet structure including a media frame in a wireless communication system according to an embodiment of the disclosure.

FIG. 16 is a conceptual diagram illustrating an IP packet structure including a media frame in a wireless communication system according to an embodiment of the disclosure.

Referring to FIG. 16, the media frame may be included in an RTP payload 1610 of an IP packet 1600. The IP packet 1600 may further include an RTP header 1620, a user datagram protocol (UDP) header 1630, and an IP header 1640 before the RTP payload 1610. The RTP header (X120) may include an RTP header extension (e.g., a header extension 1602). The first 12 octets or 12 bytes of the RTP header 1620 may be included in all RTP packets, and identifiers of contributing sources (CSRC) may be added by a mixer. Each field of the RTP header 1620 has the following meaning:

version (V): 2 bit field indicating a version of RTP. RTP according to IETF RFC 3550 has a value of 2;

padding (P): 1 bit field having a value of 1 when the RTP packet includes a padding octet;

extension (X): 1 bit field having a value of 1 when the RTP packet includes the RTP header extension 1602;

CSRC count (CC): 4 bit field indicating the number of CSRC identifiers located after the 12 octet fixed header;

marker (M): 1 bit field, and its usage is determined by an RTP profile. For example, when one video frame is divided into multiple RTP packets and transmitted, only a value of the M field of the last RTP packet among the RTP packets may be configured as 1;

payload type (PT): 7 bit field to identify an RTP payload format. A value of the field may be determined using static mapping determined by an RTP profile or dynamic mapping determined by an out-band method using a session description protocol (SDP);

sequence number: 16 bit field that increases by 1 each time each RTP packet is transmitted. It may be used for loss detection and packet order restoration by a receiver;

timestamp: 32 bit field that may indicate the acquisition time point or reproducing time point of a data sample included in the corresponding RTP packet;

SSRC: 32 bit field indicating an identifier of a synchronization source; and

CSRS: 32 bit field indicating an identifier of a contribution source.

In FIG. 16, although the media frame is shown as being included in one RTP payload 1610, the media frame may be segmented according to data size thereof, and the RTP payload 1610 may include at least a portion of the media frame (e.g., a segmented portion). For example, one media frame may be transmitted through multiple IP packets. RTP headers (e.g., the RTP header 1620) of IP packets transmitting one media frame may have the same value in the timestamp field. Successive media frames may be transmitted via an RTP stream, which is a flow of successive RTP packets, and the RTP stream may be identified by an SSRC field in an RTP session, which is defined as an association between entities participating in RTP-based communication (e.g., the UE 500 and the server 530).

In a wireless communication system according to an embodiment of the disclosure, a split rendering server (e.g., the server 530) may perform rendering based on a first pose pair to provide a media frame associated with the first pose pair and a second pose pair obtained by updating the first pose pair to a split rendering client (e.g., the UE 500). The second pose pair may be a pose pair in which only a value of SR metadata in the first pose pair is updated.

In a wireless communication system according to an embodiment of the disclosure, a split rendering server (e.g., the server 530) may include a pose pair associated with a media frame in an RTP header extension (e.g., the RTP header extension 1602) so as to transmit the same to a split rendering client (e.g., the UE 500). The RTP header extension including the pose pair may be included in an RTP packet carrying the associated media frame. In an embodiment of the disclosure, the RTP header extension including the pose pair may be added to another RTP header of the RTP stream carrying the RTP packet including the media frame, or may be added to an RTP header of a separate RTP stream.

In an embodiment of the disclosure, the RTP header extension may be identified by a uniform resource name (URN), which is a global identifier, and an ID field, which is a local identifier. The mapping between the global identifier URN and the local identifier ID field may be negotiated using a separate protocol (e.g., an SDP) during the RTP session establishment procedure. In an embodiment of the disclosure, one RTP packet may include one or more RTP header extensions, and the format and usage of the RTP header extensions included in the RTP packet may be identified by an ID field included in the RTP header extension.

A pause pair according to an embodiment of the disclosure may be transmitted through one RTP header extension or a combination of at least two RTP header extensions.

The RTP header extension including the pose pair according to an embodiment of the disclosure may include at least one of the following information:

Associated media frame identification information: as an example, a value of timestamp field or a sequence number of the first RTP header including the associated media frame;

Pose pair identification information: as an example, the time when the UE has transmitted a pose set including a pose pair to the server;

Pose information: as an example, an identifier indicating the format of a pose, including at least one of a quaternion or position (xyz) and orientation (e.g., roll, pitch, yaw), and a pose value according to the pose format; and SR metadata: as an example, at least one of the values shown in FIG. 10.

In an embodiment of the disclosure, the associated media frame identification information may be omitted when a pose pair associated with a media frame is transmitted to a header extension of the same RTP packet as the RTP packet including the media frame. In an embodiment of the disclosure, when an RTP packet transmitting a media frame and an RTP packet having an RTP header extension including a pose pair associated with the media frame are transmitted via different RTP streams, the associated media frame identification information may further include RTP stream identification information that includes the RTP packet for transmission of the media frame. The RTP stream identification information may include, for example, at least one of a value of an SSRC field in an RTP header for transmission of the media frame, and transmission and reception addresses and port numbers of an IP packet and a UDP packet. The RTP stream identification information may be exchanged between the UE 500 and the server 530 by using out-band signaling (e.g., an SDP).

According to an embodiment of the disclosure, the SR metadata may include one or more elements representing time, and may further include an identifier indicating a time representation format for the elements. The time representation format may be, for example, the same as the representation format of the timestamp field of the RTP header containing the SR metadata within the header extension, or the same as the time representation format of a network time protocol (NTP), or a format that takes only some bits from the NTP format, or a representation format separately defined by a service provider. A method of transmitting SR metadata using an RTP header extension according to an embodiment of the disclosure may use one RTP header extension that supports a plurality of time representation formats, or may use at least one RTP header extension among RTP header extensions having different URNs according to different time representation formats.

Figure 17:
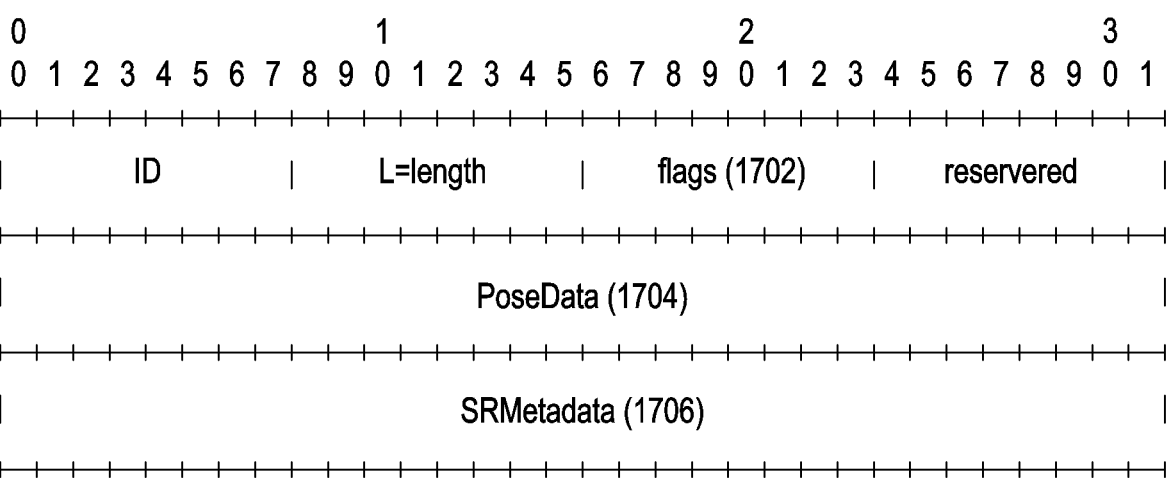
FIG. 17 illustrates a real time transport protocol (RTP) header extension structure including a pose pair according to an embodiment of the disclosure.

FIG. 17 illustrates an RTP header extension structure including a pose pair according to an embodiment of the disclosure.

Referring to FIG. 17, an RTP header extension 1700 (e.g., the RTP header extension 1602) containing a pose pair may include at least one of a local identifier (ID) field, a length (L) field, or a flags field 1702, wherein the flags field 1702 may determine the format and usage of the data structure of a following PoseData field 1704 and the data structure of a following SRMetaData field 1706.

In an embodiment of the disclosure, bits of the flags field 1702 (e.g., F0, F1, F2, F3, F4, F5, F6, and F7) may have the following meanings:

F0: An identifier indicating whether the PoseData field 1704 contains a value of pose used in the rendering of the associated media frame. For example, a case in which a value of F0 is 0 may indicate that the PoseData field 1704 contains only information to identify an estimated pose stored by the UE 500, while a case in which a value of F0 is 1 may indicate that the PoseData field 1704 contains an estimated pose;

F1: An identifier which, when the PoseData field 1704 includes a pose used in rendering of the associated media frame (e.g., when a value of F0 is 1), indicates a representation format of the pose. For example, a value of 0 for F1 may signify that the pose value is represented in the quaternion format, and a value of 1 for F1 may signify that the pose value is represented in the format of a position (e.g., xyz) and an orientation (e.g., roll, pitch, and yaw);

F2F3: A 2-bit identifier indicating the time format of the PoseData field 1704 and the SRMetaData field 1706, for example, a value of 00 for F2F3 may signify that the 64-bit length NTP timestamp format is used, a value of 01 for F2F3 may signify that only the middle 32 bits of the 64-bit length NTP timestamp are taken, and a value of 10 for F2F3 may signify that the same format as the timestamp in the RTP header is used;

F4: A 1-bit identifier indicating that parameters contained in the SRMetaData field 1706 are absolute or relative times, for example, with regard to values of the parameters contained in the SRMetaData field 1706, a value of 0 for F4 may be a relative time to be measured with reference to timePoseSetSent, and a value of 1 for F4 may be an absolute time;

F5: A 1 bit identifier indicating whether the SRMetaData field 1706 includes the D_up parameter (UE uplink time); and F6F7: A 2-bit identifier which, when the SRMetaData field 1706 has the same format as the timestamp of the RTP header, indicates a parameter of the SRMetaData field 1706 that matches the timestamp of the RTP header containing the SRMetaData field 1706. For example, the timestamp of the RTP header including the SRMetaData field 1706 may be matched to a value of T3 (timeRenderStarted) when a value of F6F7 is 00, to a value of T4 (timeRenderFinished) when a value of F6F7 is 01, or to a value of T5 (timeEncoderFinished) when a value of F6F7 is 10. In this case, the parameter matching the timestamp value of the RTP header may be omitted from the SRMetaData field 1706.

The above embodiments may assume a case in which an RTP header extension identified by a single URN (e.g., urn:3gpp:SRMeta) supports the PoseData field 1704 and SRMetaData field 1706 in all formats determined by the flag field. The RTP header extension 1602 according to an embodiment of the disclosure may include a combination of RTP header extensions identified by two or more URNs that support only a portion of the PoseData field 1704 and SRMetaData field 1706 determined by the above flag fields. For example, urn:3gpp:SRMeta-NTP, urn:3gpp:SRMeta-NTP-compact, and urn:3gpp:SRMeta-RTP-timestamp may each refer to an NTP timestamp with a length of 64 bits, the middle 32 bits of an NTP timestamp, and an RTP header extension that represents time information as a timestamp of the RTP packet header.

Figure 18:
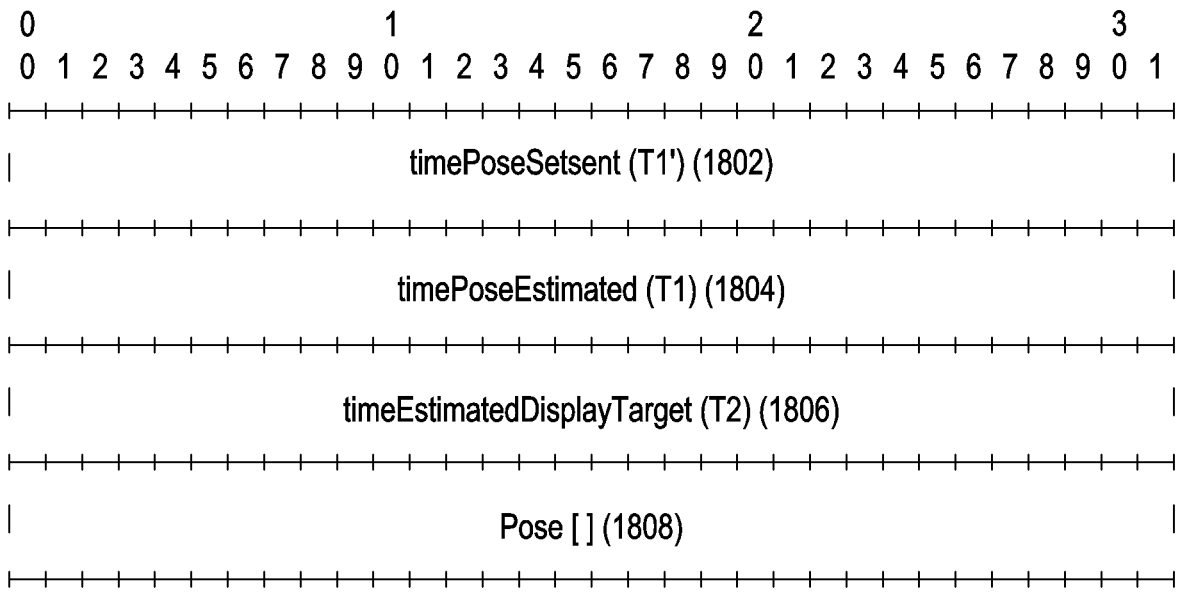
FIG. 18 illustrates a PoseData field included in an RTP header extension according to an embodiment of the disclosure.

FIG. 18 illustrates a PoseData field included in an RTP header extension according to an embodiment of the disclosure.

Referring to FIG. 18, a PoseData field 1800 (e.g., the PoseData field 1704) may include at least one of timePoseSetSent (T1') 1802 indicating a time when a pose set for a pose used in rendering of an associated media frame has been transmitted from a UE, timePoseEstimated (T1) 1804 indicating a time point at which pose estimation has been performed, timeEstimatedDisplayTaget (T2) 1806 indicating an estimated target display time used in the pose estimation, or pose[ ] 1808 indicating a pose used in the rendering of the associated media frame.

Whether each of the parameters 1802, 1804, 1806, and 1808 configuring the PoseData field 1800 exists or a value thereof may be controlled by the format of an RTP header extension (e.g., the RTP header extension 1700) (e.g., the format identifiable by a urn) including the PoseData field 1800 or by the flags field 1702 illustrated in FIG. 17.

Figure 19:
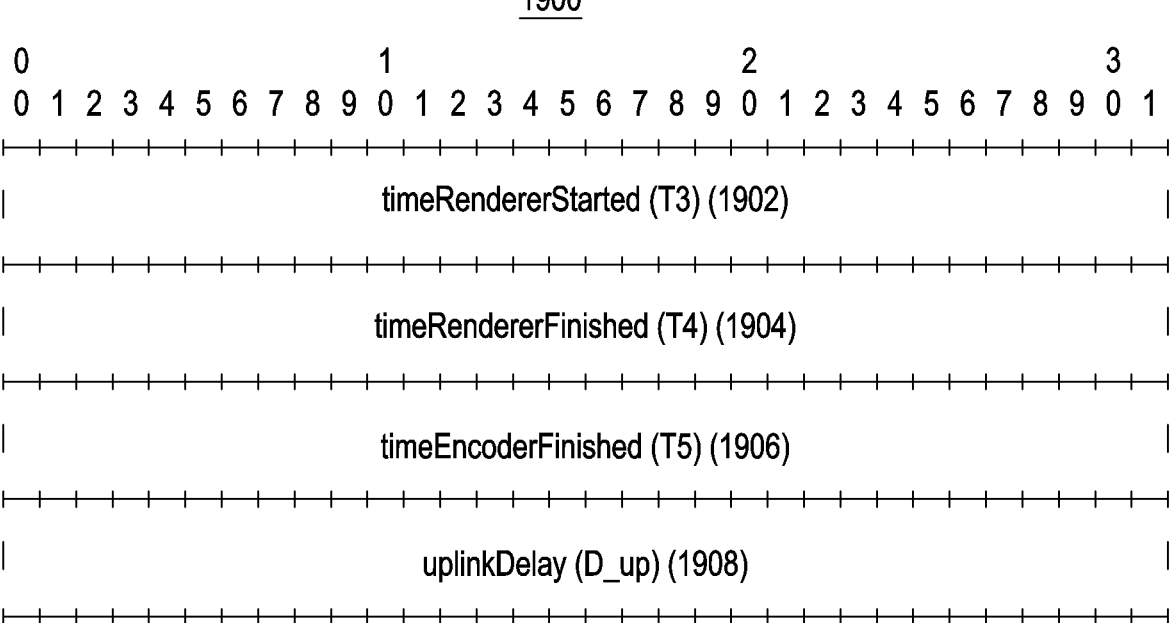
FIG. 19 illustrates an SRMetaData field included in an RTP header extension according to an embodiment of the disclosure.

FIG. 19 illustrates an SRMetaData field included in an RTP header extension according to an embodiment of the disclosure.

Referring to FIG. 19, an SRMetaData field 1900 (e.g., the SRMetaData field 1706) may include at least one of timeRenderStarted (T3) 1902 indicating a time point at which rendering of an associated media frame has started, for a pose used to render the associated media frame, timeRenderFinished (T4) 1904 indicating a time point at which rendering of the associated media frame has finished, timeEncoderFinished (T5) 1906 indicating a time point at which encoding for the associated media frame has finished, or uplinkDelay (D_up) 1908 indicating a transmission delay time of a pose set containing poses used in rendering the associated media frame.

Whether each of the parameters 1902, 1904, 1906, and 1908 configuring the SRMetaData field 1900 exists or a value thereof may be controlled by the format of the RTP header extension (e.g., the RTP header extension 1700) (e.g., identifiable as a URN) including the SRMetaData field 1900 or by the flags field 1702 illustrated in FIG. 17.

In a wireless communication system according to an embodiment of the disclosure, a split rendering server (e.g., the server 530) may transmit pairs of poses associated with media frames through a web real-time communication (We-bRTC) data channel established between a split rendering client (e.g., the UE 500) and the server 530.

The WebRTC data channel may use the UDP/datagram transport layer security (DTLS)/stream control transmission protocol (SCTP) protocol, and may be configured by pairs of SCTP streams having the same SCTP stream identifier. The data unit of the WebRTC data channel may be a chunk of SCTP. The SCTP chunk including a pose pair according to an embodiment of the disclosure may include at least one of the following information:

Associated media frame identification information: as an example, a sequence number or timestamp value of a first RTP header including the associated media frame;

Pose pair identification information: as an example, an identifier indicating the format of the pose including at least one of a quaternion or a position (e.g., xyz) and an orientation (e.g., roll, pitch, and yaw), and a pose value based on the pose format; and SR metadata: for example, at least one of the parameters of the SR metadata shown in FIG. 10.

In an embodiment of the disclosure, the above-described information elements may be encoded into a continuous bit string and included in the SCTP chunk, and the specific format and usage thereof may be the same as when using the RTP header extension described above.

Figure 20:
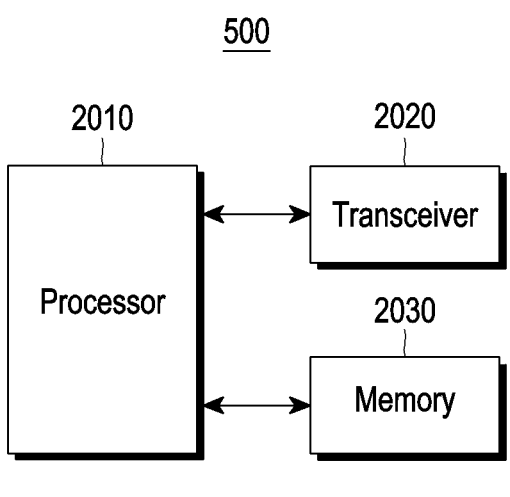
FIG. 20 is a block diagram illustrating a configuration of a UE in a communication system according to an embodiment of the disclosure.

FIG. 20 is a block diagram illustrating a configuration of a UE in a communication system according to an embodiment of the disclosure.

Referring to FIG. 20, the UE 500 may include a processor 2010, a transceiver 2020, and memory 2030. The processor 2010, the transceiver 2020, and the memory 2030 of the UE 500 may operate according to the method(s) described in the foregoing embodiments of FIGS. 1, 2, 3A, 3B, 4 to 14, 15A, 15B, and 16 to 19. However, the components of the UE 500 are not limited to the foregoing examples. For example, the UE 500 may include more components or fewer components than those described above. In addition, at least one of the processor 2010, the transceiver 2020, and the memory 2030 may be implemented in the form of a single chip.

The transceiver 2020 is a term collectively referring to a receiver and a transmitter, and the UE 500 may transmit or receive signals to or from a base station or another network entity (e.g., the server 530) through the transceiver 2020. In this case, the signals transmitted or received may include at least one of control information and data. To this end, the transceiver 2020 may include an RF transmitter that up-converts and amplifies the frequency of the transmitted signal, and an RF receiver that low-noise amplifies the received signal and down-converts the frequency thereof. This is only one example configuration of the transceiver 2020, and the components of the transceiver 2020 are not limited to the RF transmitter and RF receiver.

The transceiver 2020 may receive RF signals and output the RF signals to the processor 2010 via a communication method defined by the 3GPP standard, and may transmit control information or data, which is output from the processor 2010, to the server 530 via the RF signals over the network 100 (e.g., a base station). The transceiver 2020 may receive signals transmitted by the server 530 over the network 100 and provide the signals to the processor 2010.

The memory 2030 may store programs and data required for operation of the UE 500 according to at least one of the embodiments of FIGS. 1, 2, 3A, 3B, 4 to 14, 15A, 15B, and 16 to 19. Additionally, the memory 2030 may store control information and/or data included in signals acquired by the UE 500. The memory 2030 may include a storage medium, such as read only memory (ROM), random access memory (RAM), a hard disk, CD-ROM, and a (digital versatile disc) DVD, or a combination of storage media.

The processor 2010 may control a series of operations to enable the UE 500 to operate according to at least one of the embodiments of FIGS. 1, 2, 3A, 3B, 4 to 14, 15A, 15B, and 16 to 19. The processor 2010 may include at least one processing circuit (e.g., an application processor (AP), and/ or a communication processor (CP)). The processor 2010 may include (e.g., execute) the previously described components of the UE 500 (e.g., at least one of the SR estimator 504, the application 522, the UE pose manager 508, the metric collector 518, the MAF 510, the scene manager 512, or the pose corrector 514). At least one of the pose buffer 506, the SR meta buffer 524, the media frame buffer 526, or the display frame buffer 516 may be included in the processor 2010 or the memory 2030. Although not shown, the UE 500 may further include at least one sensor 502 and the display 520.

Figure 21:
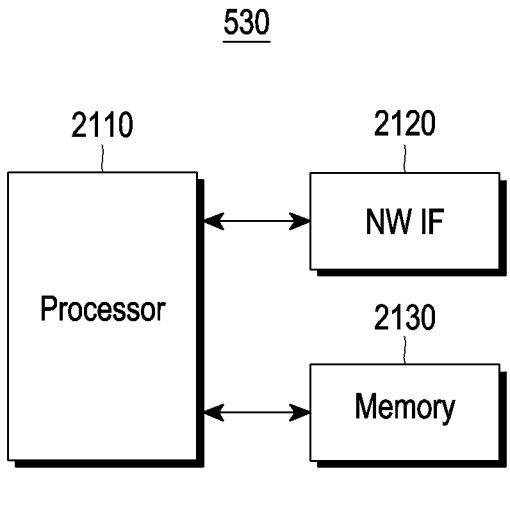
FIG. 21 is a block diagram illustrating a configuration of a server in a wireless communication system according to an embodiment of the disclosure.

FIG. 21 is a block diagram illustrating a configuration of a server in a wireless communication system according to an embodiment of the disclosure.

Referring to FIG. 21, the server 530 may include a processor 2110, a network interface (NW IF) 2120, and memory 2130. The processor 2110, the network interface 2120, and the memory 2130 of the server 530 may operate according to the method(s) described in the above-described embodiments of FIGS. 1, 2, 3A, 3B, 4 to 14, 15A, 15B, and 16 to 19. However, the components of the server 530 are not limited to the examples described above. For example, the server 530 may include more or fewer components than the components described above. In addition, at least one of the processor 2110, the network interface 2120, and the memory 2130 may be implemented in the form of a single chip.

The network interface 2120 may include a receiver and a transmitter, and the server 530 may transmit or receive signals to or from a UE (e.g., the UE 500) or another network entity through the network interface 2120. The transmitted or received signal may include at least one of control information and data.

The memory 2130 may store programs and data necessary for the operation of the server 530 according to at least one of the embodiments of FIGS. 1, 2, 3A, 3B, 4 to 14, 15A, 15B, and 16 to 19. Additionally, the memory 2130 may store control information and/or data included in signals obtained from the server 530. The memory 2130 is a storage medium, such as read only memory (ROM), random access memory (RAM), a hard disk, a compact disk ROM (CD-ROM), and a digital versatile disc (DVD), or a combination of storage media.

The processor 2110 may control a series of operations to enable the server 530 to operate according to at least one of the embodiments of FIGS. 1, 2, 3A, 3B, 4 to 14, 15A, 15B, and 16 to 19. The processor 2110 may include at least one processing circuit (e.g., AP and/or CP). The processor 2110 may include (e.g., execute) components of the server 530 described above (e.g., at least one of the SR manager 532, the server pose manager 534, the renderer 542, the encoder 538, or the packetizer 540). The sever pose buffer 536 may be included in the processor 2110 or the memory 2130.

According to an embodiment of the disclosure, one or more non-transitory computer-readable storage media storing computer-executable instructions that, when executed by one or more processors of a user equipment (UE), cause the UE to perform operations, the operations comprising: estimating, at a first time point, a pose of the UE of a second time point indicating a target display time for a first media frame, transmitting the first media frame and first pose information related to estimated pose to a server, receiving a second media frame, generated by rendering based on the first media frame and estimated pose, and second pose information associated with the second media frame from the server, generating a third media frame by correcting the second media frame based on metadata and an actual pose of the UE, and displaying the third media frame at a third time point.

In an embodiment of the disclosure, the operations may further comprise measuring a pose-to-render-to-photon (P2R2P) delay from the first time point to the third time point and a render-to-photon (R2P) delay from a time when rendering of the second media frame has been started to the third time point.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a user equipment (UE) supporting split rendering in a communication system, the method comprising:
   determining a pose-to-render-to-photon (P2R2P) delay from a first time point to a second time point;
   estimating, at the first time point, a pose of the UE of a third time point indicating a target display time for a first media frame based on the P2R2P delay;
   transmitting, to a server, first pose related information, including predicted pose information related to the estimated pose and first time metadata associated with the estimated pose;
   receiving, from the server, a first media frame, generated by rendering based on the first pose related information, and second time metadata associated with the first media frame; and
   displaying a second media frame at the second time point based on the first media frame.

2. The method of claim 1, further comprising measuring a render-to-photon (R2P) delay from a time when rendering of the second media frame has been started to the second time point.

3. The method of claim 1, wherein the predicted first pose information includes a location and a direction of the estimated pose.

4. The method of claim 1, wherein the first time metadata comprises at least one of:
   T1 indicating the first time point;
   T2.estimated indicating the third time point;
   T1' indicating a time when the first pose related information is transmitted from the UE to the server; or
   render-to-photon delay indicating T2.actual-T3, wherein T2.actual indicates time when a photon has been displayed, and T3 indicates time when the rendering started.

5. The method of claim 1, wherein the second time metadata comprises at least one of:
   T1 indicating the first time point;
   T2.estimated indicating the third time point;
   T3 indicating actual time when the server starts the rendering of the first media frame; or
   T5 indicating time when the second media frame is output from the server.

6. A method by a server supporting split rendering in a communication system, the method comprising:
   receiving, from an user equipment (UE), first pose related information, including predicted pose information related to an estimated pose and first time metadata associated with the estimated pose;
   generating a first media frame by rendering based on the first pose related information; and
   transmitting, to the UE, the first media frame and second time metadata associated with the first media frame,
   wherein the first pose related information is associated with a pose-to-render-to-photon (P2R2P) delay from a first time point to a second time point.

7. The method of claim 6, wherein the predicted pose information includes a location and a direction of the estimated pose.

8. The method of claim 6, wherein the first time metadata comprises at least one of:
   T1 indicating a first time point when the estimated pose is made in the UE;
   T2.estimated indicating a target display time estimated by the UE for the first pose related information;
   T1' indicating a time when the first pose related information is transmitted from the UE to the server; or
   render-to-photon delay indicating T2.actual-T3, wherein T2.actual indicates time when a photon has been displayed, and T3 indicates time when the rendering started.

9. The method of claim 6, wherein the second time metadata comprises at least one of:
   T1 indicating a first time point when the estimated pose is made in the UE;
   T2.estimated indicating a target display time estimated by the UE for the first pose related information;
   T3 indicating actual time when the server starts the rendering of the first pose related information; or
   T5 indicating time when the first media frame is output from the server.

10. A user equipment (UE) for supporting split rendering in a communication system, the UE comprising:
   a transceiver;
   memory; and
   a processor coupled with the transceiver and the memory,
   wherein the memory stores one or more computer programs including computer-executable instructions that, when executed by the processor, cause the UE to:

determine a pose-to-render-to-photon (P2R2P) delay from a first time point to a second time point, estimate, at the first time point, a pose of the UE of a third time point indicating a target display time for a first media frame based on the P2R2P delay, transmit, to a server, first pose related information including predicted pose information related to the estimated pose and first time metadata associated with the estimated pose, receive, from the server, a first media frame, generated by rendering based on the first pose related information, and second time metadata associated with the first media frame, and display a second media frame at the second time point based on the first media frame.

11. The UE of claim 10, wherein the predicted pose information includes a location and a direction of the estimated pose.

12. The UE of claim 10, wherein the first time metadata comprises at least one of:

T1 indicating the first time point;

T2.estimated indicating the third time point;

T1' indicating a time when the first pose related information is transmitted from the UE to the server; or render-to-photon delay indicating T2.actual-T3, wherein T2.actual indicates time when a photon has been displayed, and T3 indicates time when the rendering started.

13. The UE of claim 10, wherein the second time metadata comprise at least one of:

T1 indicating the first time point;

T2.estimated indicating the third time point;

T3 indicating actual time when the server starts the rendering of the first media frame; or T5 indicating time when the second media frame is output from the server.

14. A server for supporting split rendering in a communication system, the server comprising:

a network interface;

memory; and a processor coupled with the network interface and the memory, wherein the memory stores one or more computer programs including computer-executable instructions that, when executed by the processor, cause the server to:

receive, from a user equipment (UE), first pose related information, including predicted pose information related to an estimated pose and first time metadata associated with the estimated pose, generate a first media frame by rendering based on first pose related information, and transmit, to the UE, the first media frame and second time metadata associated with the first media frame, wherein the first pose information is associated with a pose-to-render-to-photon (P2R2P) delay from a first time point to a second time point.

15. The server of claim 14, wherein the predicted pose information includes a location and a direction of the estimated pose.

16. The server of claim 14, wherein the first time metadata comprises at least one of:

T1 indicating a first time point when the estimated pose is made in the UE;

T2.estimated indicating a target display time estimated by the UE for the first pose related information;

T1' indicating a time when the first pose related information is transmitted from the UE to the server; or render-to-photon delay indicating T2.actual-T3, wherein T2.actual indicates time when a photon has been displayed, and T3 indicates time when the rendering started.

17. The server of claim 14, wherein the second time metadata comprise at least one of:

T1 indicating a first time point when the estimated pose is made in the UE,

T2.estimated indicating a target display time estimated by the UE for the first pose related information, T3 indicating actual time when the server starts the rendering of the first pose related information, or T5 indicating time when the first media frame is output from the server.

* * * * *